US010536849B2

(12) United States Patent
Ben Henda et al.

(10) Patent No.: US 10,536,849 B2
(45) Date of Patent: Jan. 14, 2020

(54) SECURITY CONTEXT HANDLING IN 5G DURING CONNECTED MODE

(71) Applicant: Telefonaktiebolaget LM Ericsson (publ), Stockholm (SE)

(72) Inventors: Noamen Ben Henda, Stockholm (SE); Christine Jost, Lund (SE); Karl Norrman, Stockholm (SE); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/235,438

(22) Filed: Dec. 28, 2018

(65) Prior Publication Data
US 2019/0141584 A1  May 9, 2019

Related U.S. Application Data

(63) Continuation of application No. PCT/EP2018/052153, filed on Jan. 29, 2018.
(Continued)

(51) Int. Cl.
*H04W 60/02* (2009.01)
*H04W 12/04* (2009.01)
(Continued)

(52) U.S. Cl.
CPC ....... *H04W 12/0401* (2019.01); *H04L 63/062* (2013.01); *H04W 12/04033* (2019.01);
(Continued)

(58) Field of Classification Search
None
See application file for complete search history.

(56) References Cited

U.S. PATENT DOCUMENTS 8,300,827 B2  10/2012 Yang et al.
2007/0230707 A1  10/2007 Blom et al.
(Continued)

FOREIGN PATENT DOCUMENTS

WO  2018138348 A1  8/2018

OTHER PUBLICATIONS

3rd Generation Partnership Project, "3rd Generation Partnership Project; Technical Specification Group Services and System Aspects; 3GPP System Architecture Evolution (SAE); Security architecture (Release 14)", Technical Specification, 3GPP TS 33.401 V14.1.0, Dec. 2, 2016, pp. 1-152, 3GPP, France.
(Continued)

*Primary Examiner* — Kodzovi Acolatse
(74) *Attorney, Agent, or Firm* — Coats & Bennett, PLLC

(57) ABSTRACT

The present disclosure relates to methods and apparatus for flexible, security context management during AMF changes. One aspect of the disclosure is a mechanism for achieving backward security during AMF changes. Instead of passing the current NAS key to the target AMF, the source AMF derives a new NAS key, provides the new NAS key to the target AMF, and sends a key change indication to the UE, either directly or through some other network node. The UE can then derive the new NAS key from the old NAS key. In some embodiments, the AMF may provide a key generation parameter to the UE to use in deriving the new NAS key. In other embodiments, the target AMF may change one or more security algorithms.

26 Claims, 21 Drawing Sheets

Related U.S. Application Data

(60) Provisional application No. 62/452,267, filed on Jan. 30, 2017.

(51) Int. Cl.
   *H04W 36/00* (2009.01)
   *H04L 29/06* (2006.01)
   *H04W 36/14* (2009.01)
   *H04W 36/38* (2009.01)

(52) U.S. Cl.
   CPC ....... *H04W 36/0038* (2013.01); *H04W 36/14* (2013.01); *H04W 36/385* (2013.01); *H04W 60/02* (2013.01); *H04L 2463/061* (2013.01)

(56) References Cited

U.S. PATENT DOCUMENTS

| | | | |
|---|---|---|---|
| 2009/0209259 A1 | 8/2009 | Brusilovsky et al. | |
| 2010/0173610 A1 | 7/2010 | Kitazoe et al. | |
| 2011/0142239 A1* | 6/2011 | Suh | H04W 12/02 380/270 |
| 2012/0077501 A1* | 3/2012 | Zhang | H04L 9/0869 455/436 |
| 2012/0159151 A1 | 6/2012 | Janakiraman et al. | |
| 2013/0028421 A1* | 1/2013 | Feng | H04W 12/04 380/270 |
| 2013/0102270 A1* | 4/2013 | Suh | H04W 12/00 455/404.1 |
| 2013/0128866 A1 | 5/2013 | Zhang | |
| 2014/0051442 A1* | 2/2014 | Yang | H04W 36/12 455/436 |
| 2015/0208236 A1 | 7/2015 | Xu et al. | |
| 2016/0095036 A1* | 3/2016 | Stojanovski | H04W 4/08 370/331 |
| 2017/0078874 A1* | 3/2017 | Lee | H04W 12/04 |
| 2017/0265108 A1 | 9/2017 | Chen et al. | |
| 2018/0063707 A1* | 3/2018 | Lee | H04W 12/04 |
| 2018/0083972 A1 | 3/2018 | Kim | |

OTHER PUBLICATIONS

Intel Corporation (Rapporteur), "Report of email discussion: [96#34][NR} Inter-RAT mobility", 3GPP TSG-RAN WG2 NR Adhoc Meeting, Spokane, USA, Jan. 17, 2017, pp. 1-32, R2-1700320, 3GPP.

Ericsson, "Elaboration of flow details in procedure S1-based handover", 3GPP TSG-SA2 Meeting #67, Sophia Antipolis, France, Aug. 26, 2006, pp. 1-7, S2-086319, 3GPP.

Catt, "Handover consideration for 5G", SA WG2 Temporary Document, SA WG2 Meeting #118bis, Spokane, US, Jan. 16, 2017, pp. 1-5, S2-170254, 3GPP.

Nokia et al., "Security handling in mobility", 3GPP TSG SA WG3 (Security) Meeting #88-Bis, Singapore, Oct. 9, 2017, pp. 1-3, S3-172559, 3GPP.

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 9)", Technical Specification, 3GPP TS 23.401 V9.16.0, Dec. 1, 2014, pp. 1-256, 3GPP, France.

Huawei et al., "Way forward discussion for interworking", SA WG2 Temporary Document, SA WG2 Meeting #118bis, Spokane, US, Jan. 16, 2017, pp. 1-5, S2-170048, 3GPP.

Ericsson, "Clause 8.3.1.3.3 (horizontal key derivation of K_AMF at N2-Handover)", 3GPP TSG SA WG3 (Security) Meeting #89, Reno, Nov. 27, 2017, pp. 1-2, S3-173096, 3GPP.

Ericsson, "Idle mode mobility with horizontal key derivation", 3GPP TSG SA WG3 (Security) Meeting #89, Reno, Nov. 27, 2017, pp. 1-2, S3-173386, 3GPP.

Ericsson, NEC, Clause 8.3.1.3.3 (key derivation during handover, N2)—pCR, 3GPP TSG SA WG3 (Security) Meeting #88Bis, Oct. 9-13, 2017, Singapore, S3-172567.

ZTE, China UNICOM, Key hierarchy for 5G, 3GPP TSG SA WG3 (Security) Meeting #87, May 15-19, 2017, Ljubljana, Slovenia, S3-171605.

Ericsson, Security context management during AMF change, 3GPP TSG-SA WG3 Meeting #86, Sophia Antipolis, France, Feb. 6-10, 2017, S3-170274.

Ericsson (Rapporteur), Editorial corrections and allignment, SA @G2 Meeting #124, Nov. 27-Dec. 1, 2017, Reno, Nevada (USA), S2-17xxxx.

3GPP TS 23.502 V0.1.1 (Jan. 2017) 3rd Generation Partnership Project; Technical Specification Group Services and Aspects; Procedures for the 5G System; Stage 2; (Release 15).

3GPP TS 36.331 V14.1.0 (Dec. 2016) 3rd Generation Partnership Project; Technical Specification Group Radio Access Network; Evolved Universal Terrestrial Radio Access (E-UTRA); Radio Resource Control (RRC); Protocol specification (Release 14).

3rd Generation Partnership Project, "3rd Generation Partnership Project; Technical Specification Group Services and System Aspects; General Packet Radio Service (GPRS) Enhancements for Evolved Universal Terrestrial Radio Access Network (E-UTRAN) Access (Release 14)", Technical Specification, 3GPP TS 23.401 V14.2.0, Dec. 2, 2016, pp. 1-385, 3GPP.

Ericsson et al., "Registration Procedure", SA WG2 Meeting #118BIS, Spokane, WA, USA, Jan. 16, 2017, pp. 1-8, S2-170669, 3GPP.

3rd Generation Partnership Project, "Digital cellular telecommunications system (Phase 2+); Universal Mobile Telecommunications System (UMTS); 3GPP System Architecture Evolution (SAE); Security architecture (3GPP TS 33.401 version 8.1.1 Release 8)", Technical Specification, ETSI TS 133 401 V8.1.1, Jan. 1, 2009, pp. 1-56, ETSI.

Cisco Systems, Inc., "SAE-GW Administration Guide, StarOS Release 20", Mar. 31, 2016, pp. 595-608, Chapter 21, Cisco Systems, Inc., San Jose, US.

\* cited by examiner

US 10,536,849 B2

SECURITY CONTEXT HANDLING IN 5G DURING CONNECTED MODE

RELATED APPLICATIONS

This application is Continuation of PCT/EP2018/052153, filed 29 Jan. 2018, which in turn claims priority to U.S. Provisional Application No. 62/452,267, filed 30 Jan. 2017. The disclosures of each of these references are incorporated in their entireties by reference herein.

TECHNICAL FIELD

The present disclosure relates generally to security in wireless communication networks and, more particularly, to methods and apparatus for security context handling when changing between mobility management domains.

BACKGROUND

The Third Generation Partnership Project (3GPP) is currently developing the standards for Fifth Generation (5G) systems. It is expected that 5G networks will support many new scenarios and use cases and will be an enabler for the Internet of Things (IoT). It is also expected that 5G systems will provide connectivity for a wide range of new devices such as sensors, smart wearables, vehicles, machines, etc. Flexibility will be a key property in 5G systems. This new flexibility is reflected in the security requirements for network access that mandate the support of alternative authentication methods and different types of credentials other than the usual Authentication and Key Agreement (AKA) credentials pre-provisioned by the operator and securely stored in the Universal Integrated Circuit Card (UICC). More flexible security features would allow factory owners or enterprises to leverage their own identity and credential management systems for authentication and access network security.

Among the new security features in 5G systems is the introduction of a Security Anchor Function (SEAF). The purpose of the SEAF is to cater to the flexibility and dynamicity in the deployment of the 5G core network functions, by providing an anchor in a secure location for key storage. In fact, the SEAF is expected to leverage virtualization to achieve the desired flexibility. As a consequence, the Access and Mobility Management Function (AMF), the 5G function responsible for access and mobility management, can be deployed in a domain that is potentially less secure than the operator's core network, while the master key remains in the SEAF in a secure location.

The SEAF is intended to establish and share a key denoted Kseaf with the user equipment (UE), that is used for deriving other keys, such as the keys for the control plane protection (e.g., Kcn key) and the radio interface protection. These keys generally correspond to the non-access stratum (NAS) keys and the access stratum key (KENB) in Long Term Evolution (LTE) systems. The SEAF is assumed to reside in a secure location and the Kseaf key would never leave the SEAF. The SEAF communicates with the AMFs and provisions the necessary key material (derived from the Kseaf key) for the protection of the control plane (CP) and user plane (UP) traffic with the user equipment (UE). One advantage of this approach is that it avoids re-authentication each time a UE moves from an area served by one AMF to an area served by another AMF. In fact, authentication is a costly procedure, particularly when the UE is roaming.

Recently, a proposal has been introduced to co-locate the SEAF and AMF, which defeats the purpose of the SEAF in the first place. It is worth noting that the security design in LTE systems was conceptually based on the assumption that the mobility management entity (MME), i.e. the node responsible for mobility management in LTE systems, is always located in a secure location within the operator core network. This assumption does not apply to the AMF in 5G systems. In dense areas, an AMF could be deployed closer to the edge of the network and thus potentially in exposed locations (e.g., in a shopping mall). Therefore, during an AMF change, it is possible that one of the AMFs is not located in an equally secure domain as the other, and therefore the target or the source AMF might need to shield itself from the other.

The Evolved Packet System (EPS) relied on the assumption that the MME is always located in a secure location. Therefore, during an MME change, the new MME simply fetched the security context of the UE from the previous MME. In addition, an MME may optionally trigger a new authentication for forward security.

With legacy mechanisms, forward security (i.e. the old MME does not know the security context used by the new MME) could be achieved via re-authentication but there was no mechanism for backward security (i.e. the new MME does not know the security context used by the old MME). The new AMF may trigger a new authentication thus eliminating any possibility for the old AMF to determine the new keys. The need for re-authentication could, for example, be based on an operator policy taking into account the location of the different AMFs.

Relying solely on the authentication procedure is not very efficient since, performance wise, it is one of the most costly procedures. Therefore, there remains a need to provide security when changing AMFs without the need for re-authentication.

SUMMARY

The present disclosure relates to methods and apparatus for flexible, security context management during AMF changes. One aspect of the disclosure is a mechanism for achieving backward security during AMF changes. Instead of passing the current NAS key to the target AMF, the source AMF derives a new NAS key, provides the new NAS key to the target AMF, and sends a key change indication (KCI) to the UE, either directly or through some other network node. The UE can then derive the new NAS key from the old NAS key. In some embodiments, the AMF may provide a key generation parameter to the UE to use in deriving the new NAS key. In other embodiments, the target AMF may change one or more security algorithms.

According to one aspect of the disclosure, the source AMF holding a security context for a UE determines a need for an AMF change. Responsive to determining the need for the AMF change, the source AMF generates a new non-access stratum key and sends the non-access stratum key to a target AMF. In some embodiments the source AMF also sends a KCI to the UE, or to the target AMF.

One aspect of the disclosure comprises methods implemented during a handover by a source base station in an access network of a wireless communication network. The source base station sends a first handover message to a source mobility management function in a core network of the wireless communication network to initiate a handover of a UE. Subsequently, the source base station receives, responsive to the first handover message, a second handover message from the source mobility management function. The second handover message includes a KCI indicating that a non-access stratum key has been changed. The source base station forwards the second handover message with the KCI to the UE.

Another aspect of the disclosure comprises a source base station configured to perform the above methods in the preceding paragraph. In one embodiment, the base station comprises an interface circuit for communicating with a UE over an air interface; and a processing circuit adapted to handover the UE from the source base station to a target base station. The processing circuit is configured to send a first handover message to a source mobility management function in a core network of the wireless communication network to initiate a handover of a UE; receive, responsive to the handover message, a second handover message from the source mobility management function, the second handover message including a key change indication indicating that a non-access stratum key has been changed; and forward, via the interface circuit, the handover command with the key change indication to the UE.

Another aspect of the disclosure comprises methods implemented during a handover by a source mobility management function in a core network of a wireless communication network. The source mobility management function receives, from the source base station, a first handover message indicating that a handover of the UE is needed. The source mobility management function generates a new non-access stratum key, and sends the new non-access stratum key to a target mobility management function in the core network of the wireless communication network. The source mobility management function also sends a KCI to the UE in a second handover message. The KCI indicates a change of the non-access stratum key.

Another aspect of the disclosure comprises a source mobility management function configured to perform the above methods in the preceding paragraph. In one embodiment, the source mobility management function comprises an interface circuit for communicating with a base station and target mobility management function over a communication network; and a processing circuit. The processing circuit is configured to receive, from a source base station in an access network of the wireless communication network, a first handover message indicating that a handover of a UE is needed; generate a new non-access stratum key; send, responsive to the handover message, the new non-access stratum key to a target mobility management function in the core network of the wireless communication network; and send, in a second handover message, a key change indication to the UE the key change indication indicating a change of the non-access stratum key Another aspect of the disclosure comprises methods implemented during a handover by a target mobility management function in a core network of a wireless communication network. The target mobility management function receives, from the source mobility management function, a new non-access stratum key. The target mobility management function establishes a new security context including a new access stratum key derived from the new non-access stratum key, and sends the new access stratum key to a target base station.

Another aspect of the disclosure comprises a target mobility management function configured to perform the above methods in the preceding paragraph. In one embodiment, the target mobility management function comprises an interface circuit for communicating with a target base station and source mobility management function over a communication network; and a processing circuit. The processing circuit is configured to receive, from the source mobility management function, a new non-access stratum key; establish a new security context including a new access stratum key derived from the new non-access stratum key, and send the new access stratum key to a target base station.

Another aspect of the disclosure comprises methods implemented during a handover by a UE in a wireless communication network during a handover. The UE receives a handover message including a KCI from a source base station in the domain of a source mobility management function of the wireless communication network. The KCI indicates to the UE that a non-access stratum key has been changed. The UE performs a handover from the source base station to a target base station in a domain of a target mobility management function. The UE establishes, responsive to the KCI, a new security context with the target mobility management function. The new security context includes a new non-access stratum key. The UE may optionally communicate with the target mobility management function using the new non-access stratum key.

Another aspect of the disclosure comprises a UE configured to perform the methods in the preceding paragraph. In one embodiment, the UE comprises an interface circuit for communicating with one or more base stations in an access network of a wireless communication network, and a processing circuit. The processing circuit is configured to receive a handover message from a source base station in a first mobility management domain of the wireless communication network, said handover message including a key change indication; perform a handover from the source base station to a target base station in a second mobility management domain of the wireless communication network; and establish, responsive to the key change indication, a new security context with a target mobility management function, said new security context including a new non-access stratum key.

Another aspect of the disclosure comprises methods implemented during a handover by a source mobility management function in a core network of a wireless communication network when a UE in idle mode changes mobility management functions. The source mobility management function receives a request for a security context for the UE from a target mobility management function. The source mobility management function generates a new non-access stratum key, and sends, responsive to the request, the new non-access stratum key and a KCI to the target mobility management function. The KCI indicates a change of the non-access stratum key.

Another aspect of the disclosure comprises a source mobility management function configured to perform the methods in the preceding paragraph. In one embodiment, the source mobility management function comprises an interface circuit for communicating with a base station and target mobility management function over a communication network; and a processing circuit. The processing circuit is configured to receive a request for a security context for the UE from a target mobility management function; generate a new non-access stratum key; and send, responsive to the request, the new non-access stratum key and a KCI to the target mobility management function. The KCI indicates a change of the non-access stratum key.

Another aspect of the disclosure comprises methods implemented during a handover by target mobility management function in a core network of a wireless communication network when a UE in idle mode changes mobility management functions. The target mobility management function receives, from the UE, a registration message or other control message indicating a mobility management function change. The target mobility management function requests a security context from a source mobility management function in the wireless communication network. Responsive to the request, the target mobility management function receives a new non-access stratum key and a KCI indicating the non-access stratum key has been changed. The target mobility management function sends the KCI to the UE and optionally establishes a new security context for the UE including the new non-access stratum key.

Another aspect of the disclosure comprises a target mobility management function configured to perform the methods in the preceding paragraph. In one embodiment, the target mobility management function comprises an interface circuit for communicating with a target base station and source mobility management function over a communication network; and a processing circuit. The processing circuit is configured to receive, from the UE, a registration message or other control message indicating a mobility management function change; request, responsive to the registration message, a security context from a source mobility management function in the wireless communication network; responsive to the request, receive a new non-access stratum key and a KCI indicating the non-access stratum key has been changed; and send the KCI to the UE and optionally establishes a new security context for the UE including the new non-access stratum key Another aspect of the disclosure comprises methods implemented during a handover by an idle mode UE in a wireless communication network when the UE changes AMFs. The UE sends a registration message or other control message to a target mobility management function in the wireless communication network. The UE receives, responsive to the registration message or other control message, a KCI indicating that a non-access stratum key has been changed. Responsive to the KCI, the UE generates a new non-access stratum key. After generating the new non-access stratum key, the UE may optionally establish a new security context with the target mobility management function, where the new security context includes the new non-access stratum key and thereafter communicate with the target mobility management function using the new non-access stratum key.

Another aspect of the disclosure comprises a UE configured to perform the methods in the preceding paragraph. In one embodiment, the UE comprises an interface circuit for communicating with one or more base stations in an access network of a wireless communication network, and a processing circuit. The processing circuit is configured to send a registration message or other control message to a target mobility management function in the wireless communication network; receive, responsive to the registration message or other control message, a KCI indicating that a non-access stratum key has been changed; responsive to the KCI, generate a new non-access stratum key. After generating the new non-access stratum key, the UE may optionally establish a new security context with the target mobility management function, where the new security context includes the new non-access stratum key and thereafter communicate with the target mobility management function using the new non-access stratum key.

Other aspects and embodiments of the disclosure are included in the enumerated embodiments.

DETAILED DESCRIPTION

Figure 1:
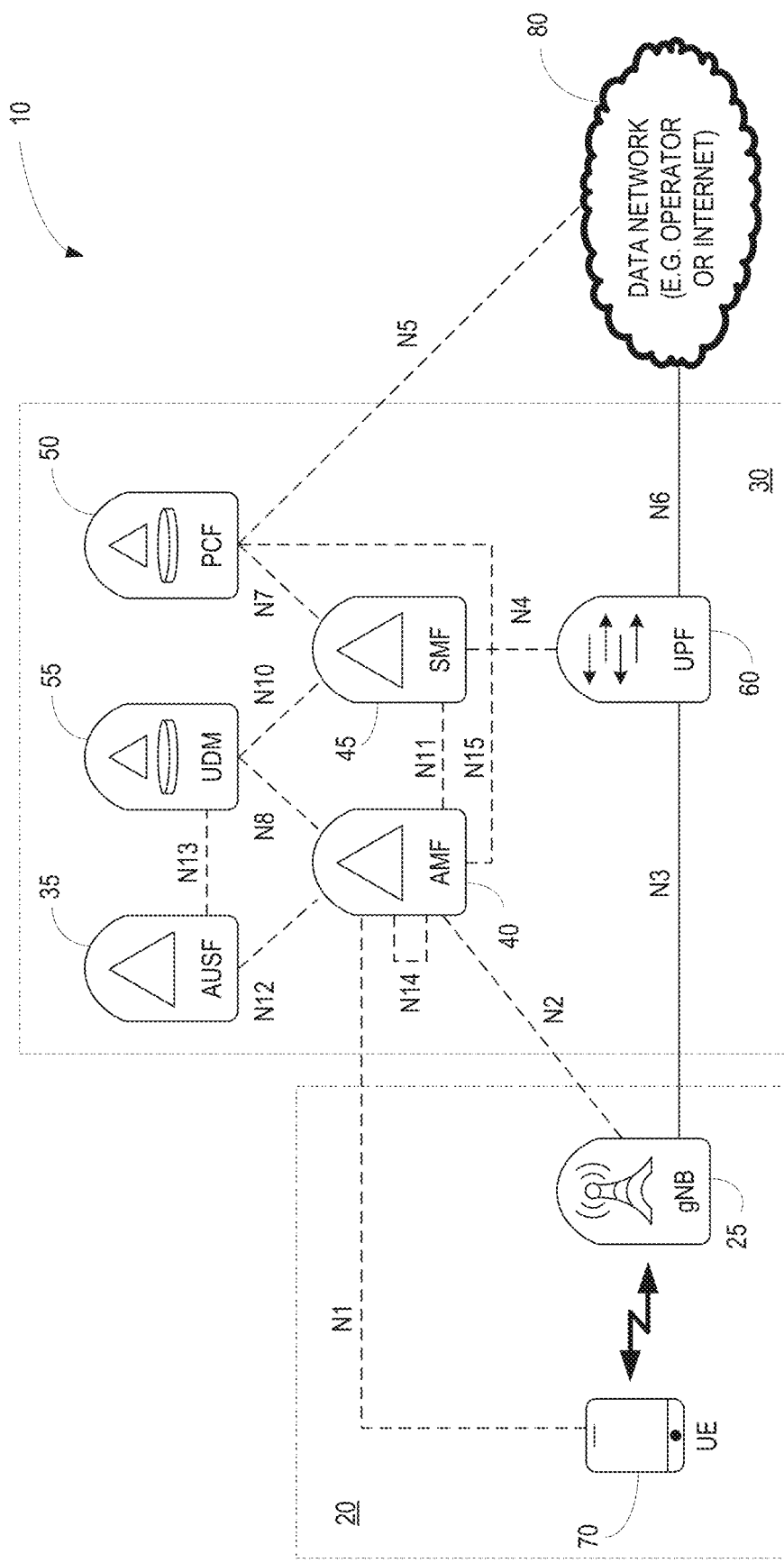
FIG. 1 illustrates an exemplary wireless communication network.

Referring now to the drawings, an exemplary embodiment of the disclosure will be described in the context of a 5G wireless communication network. Those skilled in the art will appreciate that the methods and apparatus herein described are not limited to use in 5G networks, but may also be used in wireless communication networks operating according to other standards.

FIG. 1 illustrates a wireless communication network 10 according to one exemplary embodiment. The wireless communication network 10 comprises a radio access network (RAN) 20 and a core network 30. The RAN 20 comprises one or more base stations 25 providing radio access to UEs 70 operating within the wireless communication network 10. The base stations 25 are also referred to as gNodeBs (gNBs). The core network 30 provides a connection between the RAN 20 and other packet data networks 80.

In one exemplary embodiment, the core network 30 comprises an authentication server function (AUSF) 35, access and mobility management function (AMF) 40, session management function (SMF) 45, policy control function (PCF) 50, unified data management (UDM) function 55, and user plane function (UPF) 60. These components of the wireless communication network 10 comprise logical entities that reside in one or more core network nodes. The functions of the logical entities may be implemented by one or more processors, hardware, firmware, or a combination thereof. The functions may reside in a single core network node, or may be distributed among two or more core network nodes.

The AMF 40, among other things, performs mobility management functions similar to the MME in LTE. The AMF and MME are referred to herein generically as mobility management functions. In the exemplary embodiment shown in FIG. 1, the AMF 40 is the termination point for non-access stratum (NAS) security. The AMF 40 shares a key, denoted the core network key (Kcn), with the UE 70 that is used to derive the NAS lower level protocol keys for integrity and confidentiality protection. The Kcn is generally equivalent to the base key named Kasme in the Evolved Packet System (EPS). The Kcn key is generally equivalent to the KAMF key used in the 5G specifications. It is always the case that following authentication, a new Kcn is taken into use. How the Kcn key is established after authentication is not a material aspect of the present disclosure. The methods and apparatus described herein do not depend on the particular method used for computing Kcn after authentication. That is, the security context handling methods work regardless of whether the Kcn is derived from a higher level key or is established directly by the authentication procedure similar to the establishment of Kasme in EPS.

Once a UE 70 is authenticated, the UE 70 may move between cells within the network. When a UE 70 moves between cells while in a connected mode, a handover is executed. When a UE 70 in idle mode moves between cells, a location update procedure may be executed. The AMF 40 keeps track of the location of the UE 70 in its domain. Typically, the core network 30 will have multiple AMFs 40, each providing mobility management services in a respective domain. When a UE 70 moves between cells supervised by different AMFs 40, the security context needs to be transferred from the source AMF 40 to the target AMF 40.

In LTE systems, the security context is transferred unaltered from a source mobility management entity (MME) to the target MME during an inter-MME handover or location update. Following a AMF change, a NAS security mode command (SMC) procedure may be performed, which takes new NAS and access stratum (AS) keys into use. Generation of NAS and AS keys may be necessary, for example, when an algorithm change is needed at the NAS level. Generally, changing the algorithm used at the NAS protocol layer does not have any effect on the AS keys. However, changing the main NAS context key renders the current AS keys outdated.

One aspect of the disclosure is a mechanism for achieving backward security during AMF changes. Instead of passing the current NAS key to the target AMF 40, the source AMF 40 derives a new NAS key, provides the new NAS key to the target AMF 40, and sends a KCI to the UE 70. The UE 70 can then derive the new NAS key from the old NAS key. In some embodiments, the source AMF 40 may provide a key generation parameter to the UE 70 to use in deriving the new NAS key. In other embodiments, the target AMF 40 may change one or more security algorithms.

Figure 2:
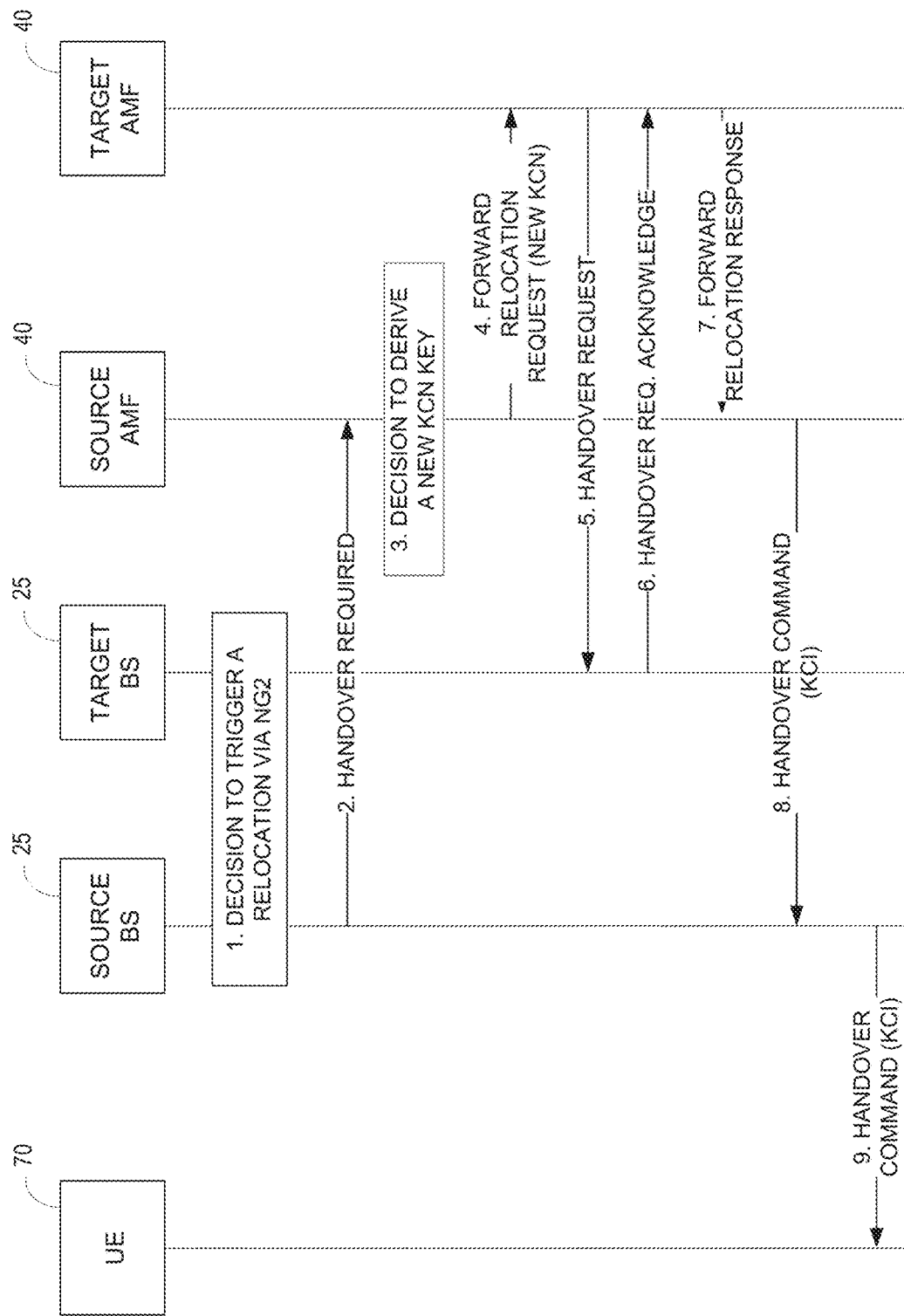
FIG. 2 illustrates a procedure for security context handling during a handover.

FIG. 2 illustrates an exemplary procedure for transferring a security context during a handover where the AMF changes. At step 1, the source base station 25 (e.g., source gNB) decides to initiate an N2-based handover due, for example, to no Xn connectivity to the target base station 25 (e.g. target gNB). The Xn interface is the 5G equivalent of the X2 interface in EPS. At step 2, the source base station 25 sends a handover required message (or 5G equivalent of handover required message) to the source AMF 40. This is the AMF 40 currently serving the UE 70, with which it shares a full NAS security context based on a non-access stratum key referred to herein as the Kcn key. The Kcn key was established possibly following a previous authentication or AMF 40 change procedure. At step 3, the source AMF 40 selects the target AMF 40 and decides to derive a new Kcn key in order to shield itself and all the previous sessions from the target AMF 40. The decision to derive a new key may be based on an operator specific security policy.

As an example a new Kcn key could be taken into use when an AMF set changes. It is generally assumed that a horizontal key derivation is not needed when an AMF set does not change. The current reasoning behind these two assumptions is that 5G security context is stored in the Unstructured Data Storage network function (UDSF) within an AMF set. So, when a UE is assigned a different AMF within the same AMF set, then horizontal derivation of KCN is not necessary. But when a UE is assigned a different AMF in a different AMF set, then the UDSF is different and a horizontal derivation of Kcn is necessary. These assumptions, however, may not hold true for all possible network deployments. First, the UDSF is an optional network function. Further, there is no reason to restrict the network architecture to deployments where there is a shared storage only within an AMF set. Some network deployments could have secure storage across multiple AMF sets. In this case, it is not necessary to mandate horizontal derivation of Kcn when the AMF set changes. Similarly, some network deployments could use multiple secure storage within a single AMF set. In this case, horizontal key derivation may be desirable even when the UE 70 does not change AMF sets. Therefore, decision to perform horizontal derivation of Kcn when changing between AMF should be done according to network policy, rather than mandating/restricting based on AMF set. For example, the network operator may have a policy that a new Kcn is required when the UE 70 changes from a source AMF 40 to a target AMF 40 that do not share the same secure storage.

Returning to FIG. 2, the source AMF 40, at step 4, sends a forward relocation request message (or 5G equivalent) including the new Kcn key along with any relevant security parameters, such as the UE capabilities. The target AMF 40 uses this Kcn key to set up a new security context and derive a new AS key. At step 5, the target AMF 40 sends a handover request (or 5G equivalent) to the target base station 25. The handover request includes the new AS key and all relevant security parameters, such as the UE capabilities. This establishes the UE 70 security context at the target base station 25. At step 6, the target base station 25 acknowledges the handover request. Responsive to the acknowledgement, the target AMF 40 sends, at step 7, a forward relocation response message (or 5G equivalent) including a transparent container to the source AMF 40. This container is forwarded all the way down to the UE 70 in steps 8 and 9.

At steps 8 and 9, the source AMF 40 sends a handover command message to the UE 70 via the source base station 25, which forwards the handover command to the UE 70. The handover command includes the relevant information from the forward relocation response message and a KCI indicating that a new Kcn has been derived. The KCI may comprise an explicit key change indicator flag set to a value indicating that the Kcn key has been changed. Responsive to the KCI, the UE 70 establishes a new security context and derives a new Kcn. The UE 70 uses the new Kcn key to derive a new AS key for communicating with the target base station 25.

Figure 3:
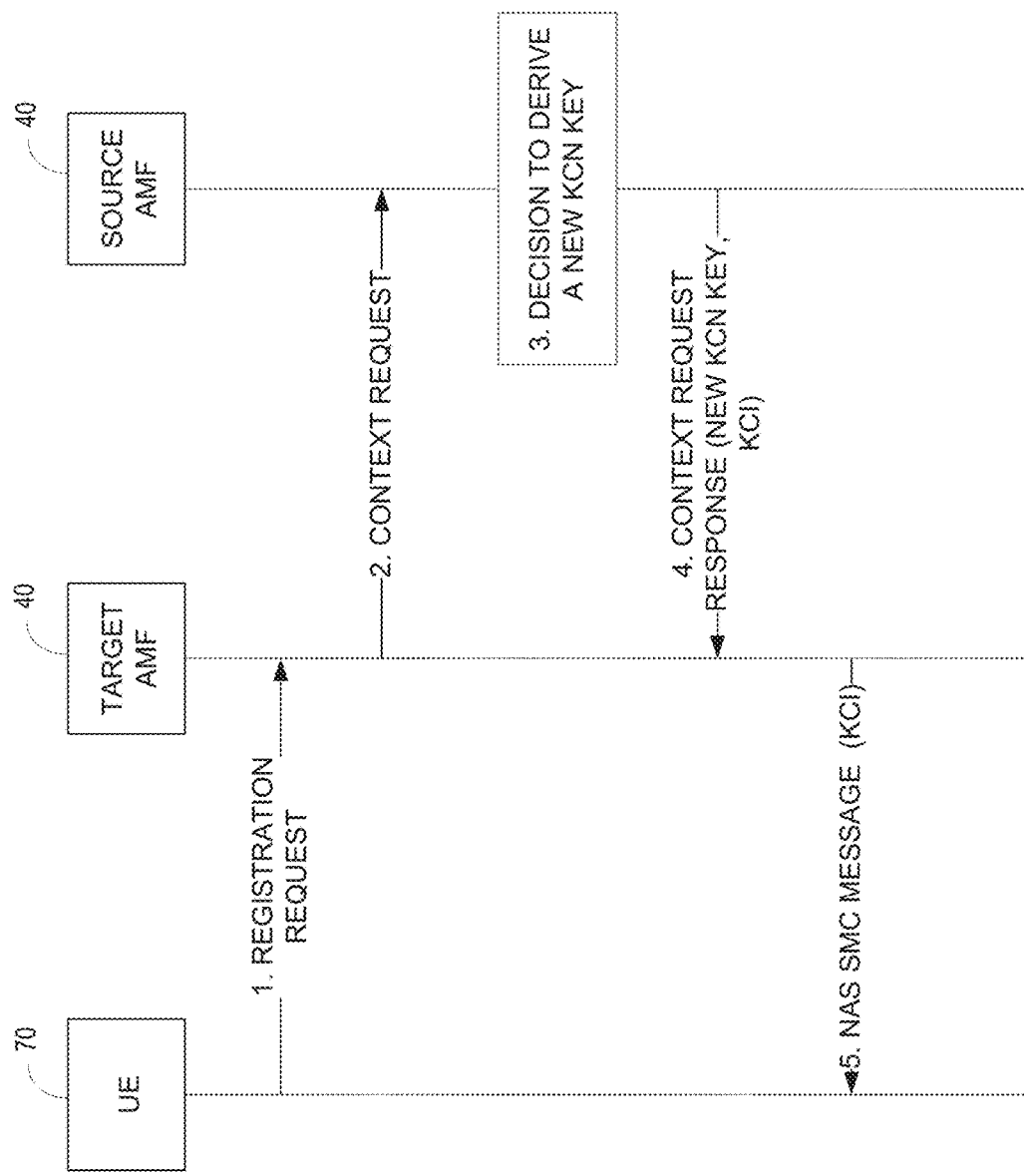
FIG. 3 illustrates a first procedure for security context handling when a UE changes AMFs in an idle mode.

FIG. 3 illustrates an exemplary procedure for transferring a security context when a UE 70 in idle mode changes AMFs 40. In EPS, location update during idle mode is indicated by the UE 70 in a Tracking Area Update (TAU) request. In 5G, it is expected that the UE 70 will use a registration request of type "mobility registration" as specified in TS 23.502, § 4.1.1.2.

At step 1, the UE 70 sends a registration request (Registration type=mobility registration, other parameters) to the new AMF 40 (i.e. the target AMF). Those skilled in the art will appreciate that other messages may be sent to initiate a location update. The registration request message includes all the necessary information to enable the new AMF 40 to identify the old AMF 40 (i.e. the source AMF), which is currently holding the UE 70 security context. At step 2, the new AMF 40 sends, responsive to the registration request message, a context request message to the old AMF 40 to request the security context for the UE 70. At step 3, old AMF 40 decides to derive a new Kcn key in order to shield itself and all the previous sessions from the target AMF 40. The decision may be based on an operator specific security policy.

At step 4, the old AMF 40 sends a context request response message to the new AMF 40. The context request response message contains the necessary UE 70 security context information including the new Kcn key. The context request response message further includes a KCI indicating that the NAS key, Kcn, has been changed. The old Kcn key is not sent to the new AMF 40. The new AMF 40 uses the new Kcn key to establish a new security context and activates the new security context by performing a NAS SMC procedure or similar procedure with the UE 70 as specified in TS 33.401, § 7.2.4.4. At step 5, the UE 70 is informed of a key change via a KCI in the first downlink message of the NAS SMC procedure, or other message sent during the NAS SMC procedure.

The NAS security context based on the Kcn key is shared between the UE 70 and the AMF 40 currently serving it. The security context includes security parameters similar to those in LTE systems, such as the NAS counters, key set identifier, etc. In one exemplary embodiment, a horizontal key derivation mechanism is used to generate a new Kcn key during AMF 40 change. The derivation of the new Kcn could be solely based on the previous Kcn. From a security perspective, there is no benefit from an additional input in the key derivation step.

Figure 4:
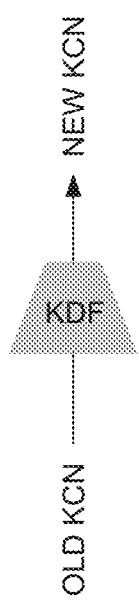
FIG. 4 illustrates a first exemplary key generation procedure.

FIG. 4 illustrates a first key derivation procedure. In this embodiment, it is assumed that the key derivation function (KDF) derives the new Kcn key based solely on the old Kcn key. This key chaining from AMF 40 to AMF 40 may continue on until a new authentication is performed. It may be left to the operator's policy how to configure the AMF 40 in respect to which security mechanism is selected during an AMF 40 change. For example, depending on an operator's security requirements, the operator can decide whether to perform re-authentication at the target AMF 40, or whether a key change is needed at the source AMF 40.

Figure 5:
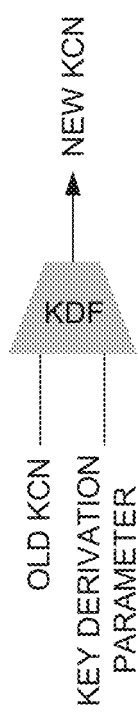
FIG. 5 illustrates a second exemplary key generation procedure

FIG. 5 illustrates another key derivation procedure. This embodiment may be useful in scenarios where an AMF 40 needs to prepare keys in advance for more than one potential target AMF 40. In this case, an additional key derivation parameter (KDP) is needed for cryptographic separation, so that different Kcn keys are prepared for different potential target AMFs 40. Depending on the parameter type, the UE 70 might need to be provided with the chosen KDP in addition to the KCI. In some embodiments, the KDP may also serve as an implicit KCI so that a separate KCI is not required. For example, where the KDP comprises a nonce generated by the source AMF 40, the nonce needs to be provided to the UE 70. Other potential KDPs include a timestamp, a version number, and a freshness parameter. During a handover in connected mode, the KDP could be sent from the source AMF 40 to the UE 70 via the source base station 25 in a handover command. Alternatively, the KDP may be sent to the UE 70 via the target AMF 40 in a transparent NAS container. During a registration or location update procedure, the KDP could be sent from the target AMF 40 in a NAS SMC. However, in scenarios where the KDP is otherwise available to the UE 70, such as an AMF public identifier-like parameter, it may not be necessary to provide the UE 70 with the KDP parameter. More generally, any static information, such as a static network configuration parameter or static UE configuration parameter, known to the UE 70 and Source AMF 40 may be used as a KDP.

Figure 6:
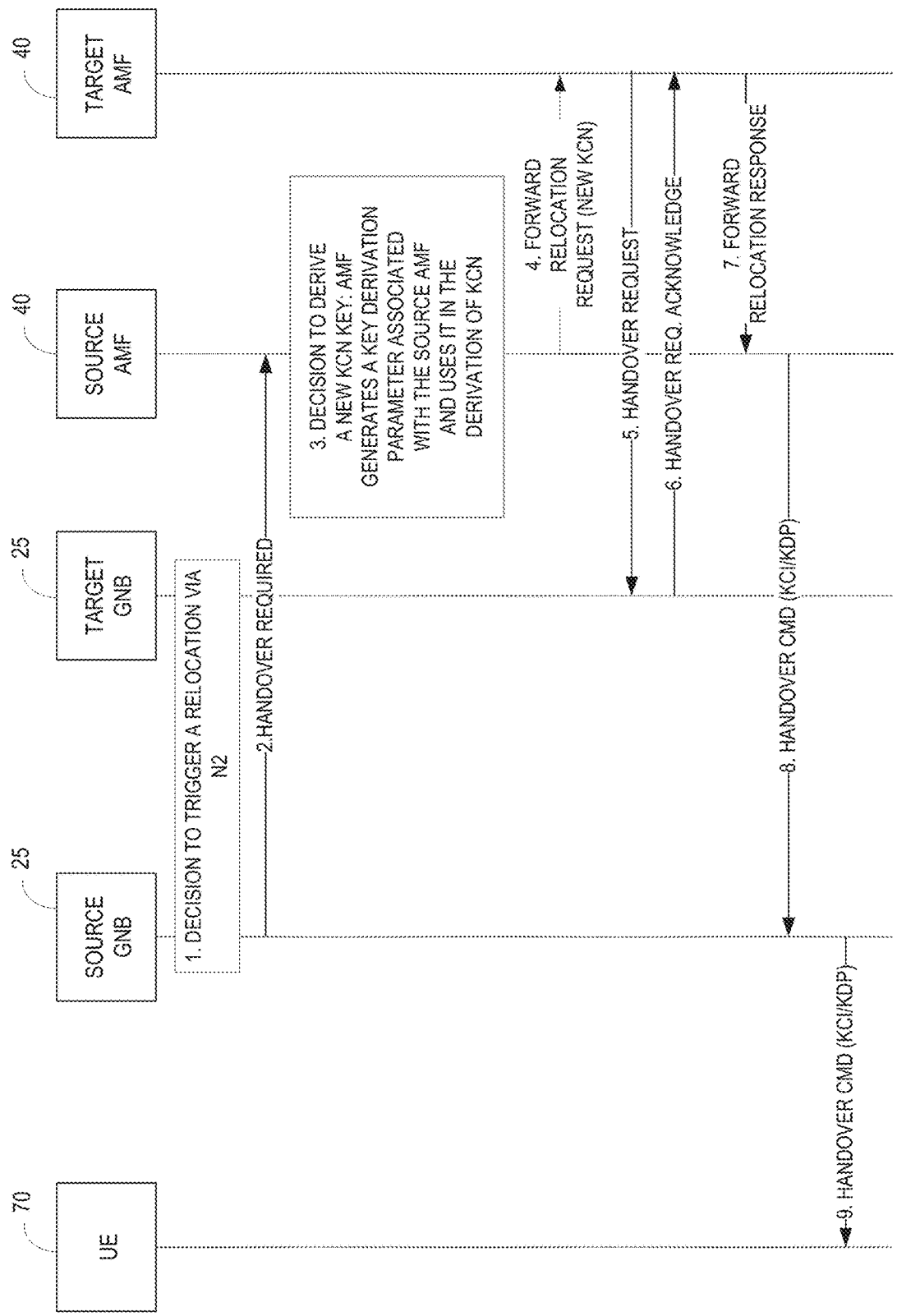
FIG. 6 illustrates a second procedure for security context handling during a handover.

FIG. 6 illustrates a handover procedure where a KDP is used to derive the new Kcn key. This procedure is generally the same as the procedure shown in FIG. 2. For the sake of brevity, steps that are unchanged are not described. At step 3, the source AMF 40 selects the target AMF 40 and decides to derive a new Kcn key in order to shield itself and all the previous sessions from the target AMF 40. In this embodiment, the source AMF 40 generates a KDP (e.g., version number) and uses the KDP to derive the new Kcn key. At step 4, the source AMF 40 sends a forward relocation request message (or 5G equivalent) including the new Kcn key along with any relevant security parameters, such as the UE capabilities. The target AMF 40 uses this Kcn key to set up a new security context and derive a new AS key. The source AMF 40 does not provide the KDP to the new AMF 40. Instead, at step 8, the source AMF 40 sends a handover command to the source base station 25, wherein the handover command includes the KDP in addition to or in place of the KCI. As noted above, the KDP may serve as an implicit KCI. Responsive to the KCI and/or KDP, the UE 70 establishes a new security context and derives a new Kcn using the KDP. The UE 70 may use the new Kcn key to derive a new AS key for communicating with the target base station 25.

Figure 7:
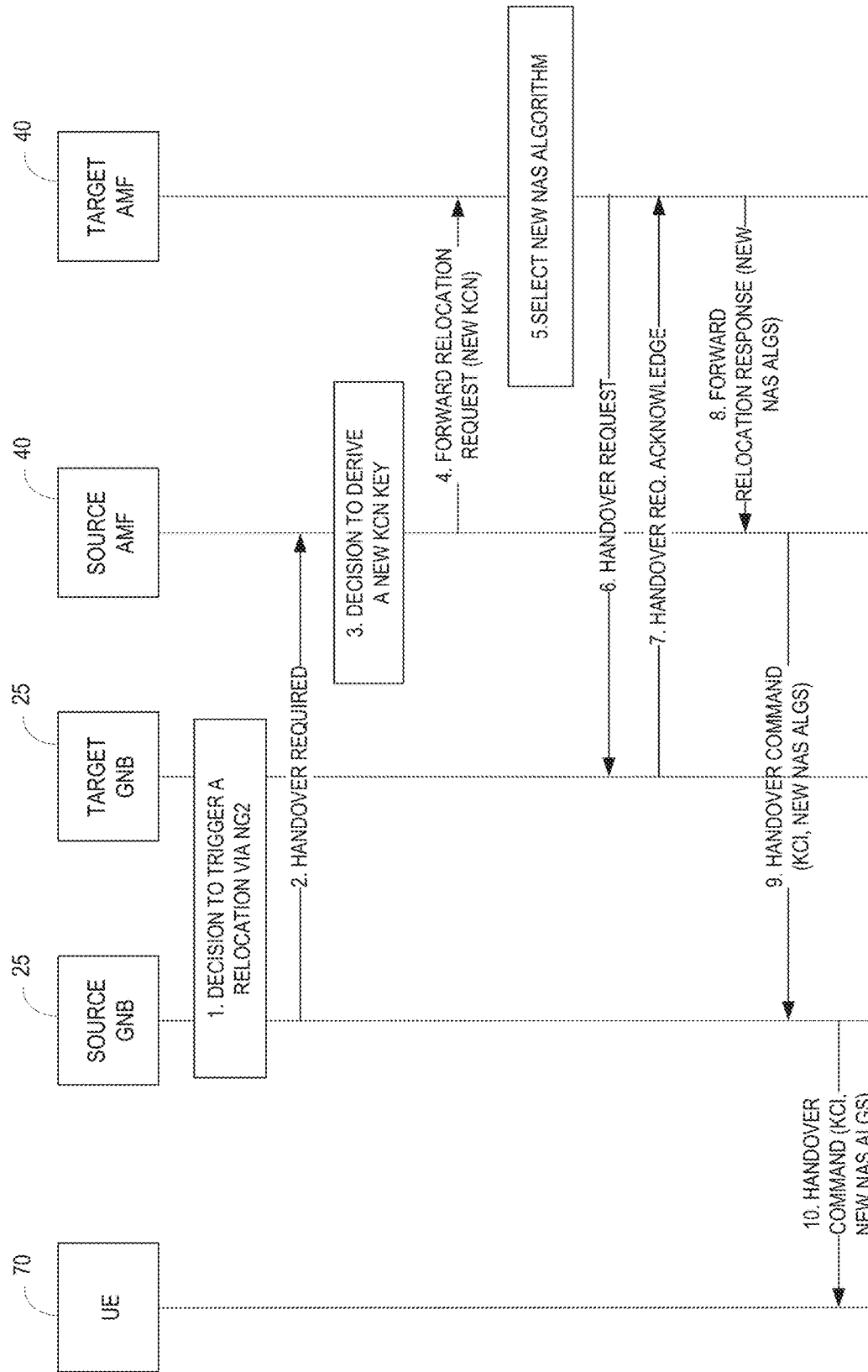
FIG. 7 illustrates a third procedure for security context handling during a handover.

In LTE systems, a NAS algorithm change at the target AMF 40 can only take effect through a NAS SMC procedure. Since the UE 70 capabilities are sent with other UE 70 context information to the target AMF 40, it is possible for the target AMF 40 to indicate which new NAS algorithms have been selected. FIG. 7 illustrates an exemplary handover procedure where the target AMF 40 selects one or more new NAS security algorithms (e.g., cryptographic algorithms). Steps 1-4 are the same as described in FIG. 2. At step 5, the target AMF 40 selects one or more new NAS security algorithms. Steps 6 and 7 are the same as steps 5 and 6 in FIG. 2. At step 8, the target AMF 40 includes an indication of the new security algorithms in the transparent container to the source information element of the forward relocation response message sent to the source AMF 40. This container is forwarded all the way down to the UE 70 in steps 9 and 10. The security algorithm indication may be included with the KCI in the handover command, or in a separate message. As a consequence, the UE 70 has all the necessary parameters to activate the NAS security context with the target AMF 40 without the need of a NAS SMC procedure. This mechanism works regardless how the Kcn key is derived.

Figure 8:
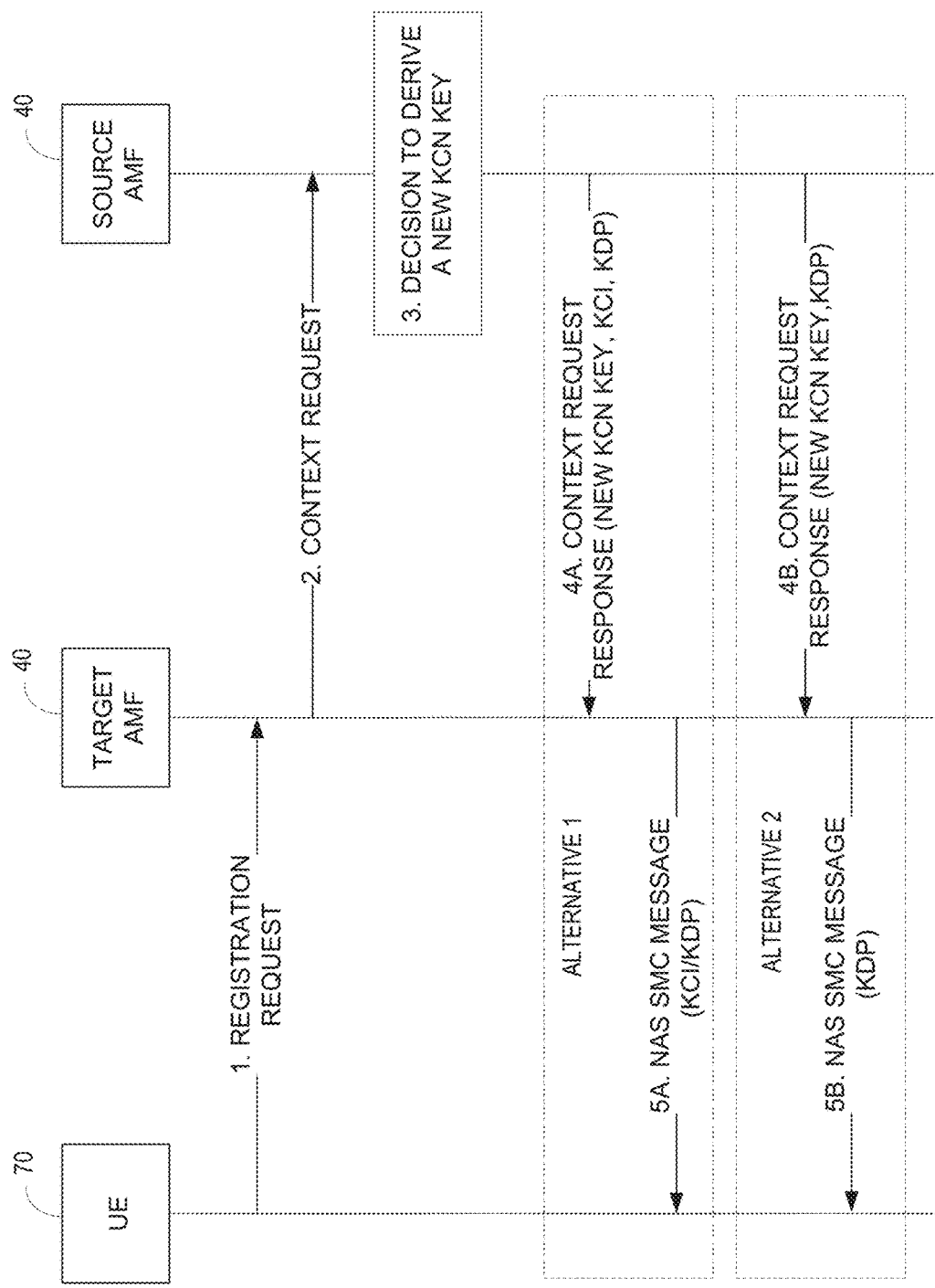
FIG. 8 illustrates a second procedure for security context handling when a UE changes AMFs in an idle mode.

FIG. 8 illustrates an exemplary procedure for transferring a security context when a UE 70 in idle mode changes AMFs 40. This procedure is similar to the procedure shown in FIG. 3. In EPS, location update during idle mode is indicated by the UE 70 in a Tracking Area Update (TAU) request. In 5G, it is expected that the UE 70 will use a registration request of type "mobility registration" as specified in TS 23.502, § 4.1.1.2.

At step 1, the UE 70 sends a registration request (Registration type=mobility registration, other parameters) to the new AMF 40 (i.e. target AMF). Those skilled in the art will appreciate that other messages may be sent to initiate a location update. The registration request message includes all the necessary information to enable the new AMF 40 to identify the old AMF 40 (i.e. source AMF), which is currently holding the UE 70 security context. At step 2, the new AMF 40 sends, responsive to the registration request message, a context request message to the old AMF 40 to request the security context for the UE 70. At step 3, old AMF 40 decides to derive a new Kcn key in order to shield itself and all the previous sessions from the target AMF 40. The decision may be based on an operator specific security policy.

In one embodiment denoted Alternative 1, the old AMF 40 sends, at step 4A, a context request response message to the new AMF 40. The context request response message contains the necessary UE 70 security context information including the new Kcn key. The context request response message further includes a KCI indicating that the NAS key, Kcn, has been changed and a KDP used to derive the new Kcn key. The old Kcn key is not sent to the new AMF 40. The new AMF 40 uses the new Kcn key to establish a new security context and activates the new security context by performing a NASSMC procedure or similar procedure with the UE 70 as specified in TS 33.401, § 7.2.4.4. At step 5A, the KCI and KDP (e.g. a freshness parameter or nonce) is sent to the UE 70 in the first downlink message of the NAS SMC procedure, or other downlink message in the NAS SMC procedure. The KCI indicates to the UE 70 that the Kcn key has been changed. The KDP is a security parameter that is used by the UE 70 to derive the new Kcn key. In this embodiment, the KCI and KDP are separate parameters.

In another embodiment denoted Alternative 2, the old AMF 40 sends, at step 4B, a context request response message to the new AMF 40. The context request response message contains the necessary UE 70 security context information including the new Kcn key. The context request response message further includes a KDP implicitly indicating that the NAS key, Kcn, has been changed. The old Kcn key is not sent to the new AMF 40. The new AMF 40 uses the new Kcn key to establish a new security context and activates the new security context by performing a NAS SMC or similar procedure with the UE 70 as specified in TS 33.401, § 7.2.4.4. At step 5B, the new AMF 40 sends the KDP (e.g. a freshness parameter or nonce) to the UE 70 in the first downlink message of the NAS SMC procedure, or some other downlink message in the NAS SMC procedure. The KDP functions as a key change indication to indicate to the UE 70 that the NAS key has been changed. The UE 70 uses the KDP and its old Kcn key to derive the new Kcn key.

Figure 9:
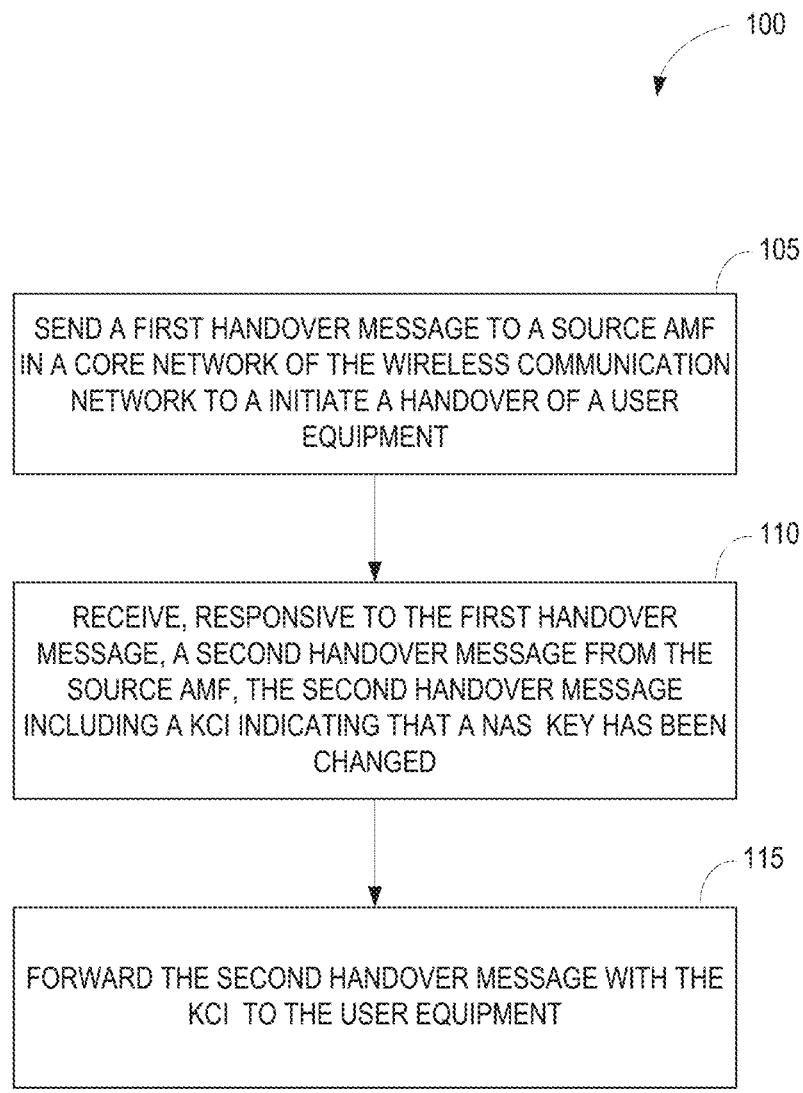
FIG. 9 illustrates a method implemented by a source base station during a handover.

FIG. 9 illustrates an exemplary method 100 implemented during a handover by a source base station 25 in an access network of a wireless communication network 10. The source base station 25 sends a first handover message to a source AMF 40 in a core network 30 of the wireless communication network 10 to initiate a handover of a UE 70 (block 105). Subsequently, the source base station 25 receives, responsive to the first handover message, a second handover message from the source AMF 40 (block 110). The second handover message includes a KCI indicating that a non-access stratum key (e.g. KCN) has been changed. The source base station 25 forwards the second handover message with the KCI to the UE 70 (block 115).

In some embodiments of the method 100, the KCI comprises a key change indicator flag set to a value indicating that the non-access stratum key has been changed. In other embodiments, the KCI comprises a security parameter implicitly indicating that the non-access stratum key has been changed. The security parameter comprises one of a nonce, timestamp, freshness parameter and version number.

Some embodiments of the method 100 further comprise receiving, from the source AMF 40, a KDP needed by the UE 70 to generate a new non-access stratum key, and forwarding the KDP to the UE 70. In some examples, the KDP is received with the KCI in the second handover message. The KDP comprises, for example, one of a nonce, timestamp, freshness parameter and version number. In some embodiments, the key derivation serves as an implicit KCI.

Some embodiments of the method 100 further comprise receiving, from the source AMF 40, a security algorithm parameter indicating at least one security algorithm to be used by the UE 70, and forwarding the security algorithm parameter to the UE 70. In one example, the security algorithm parameter is received with the KCI in the second handover message.

In one embodiment of the method 100, the first handover message comprises a handover required message indicating a need for a handover of the UE 70.

In one embodiment of the method 100, the second handover message comprises a handover command including a KCI.

In one embodiment of the method 100, the non-access stratum key comprises a core network key (Kcn).

Figure 10:
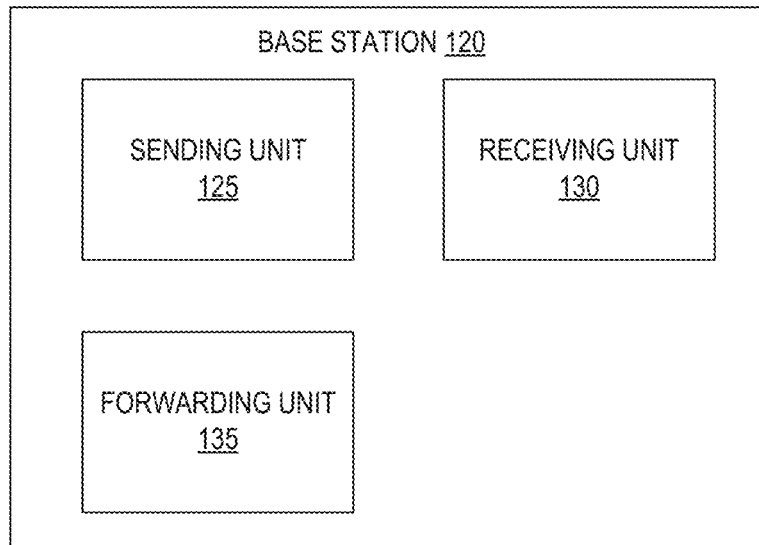
FIG. 10 illustrates an exemplary base station configured to perform the method of FIG. 9.

FIG. 10 is an exemplary base station 120 configured to perform the method 100 shown in FIG. 9. The base station 120 comprises a sending unit 125, a receiving unit 130 and a forwarding unit 135. The sending unit 125 is configured to send a first handover message to a source AMF 40 in a core network 30 of the wireless communication network 10 to initiate a handover of a UE 70. The receiving unit 130 is configured to receive, responsive to the first handover message, a second handover message from the source AMF 40. The forwarding unit 135 is configured to forward the second handover message with the KCI to the UE 70. The KCI indicates a change of the non-access stratum key (e.g. KCN). The sending unit 125, receiving unit 130 and forwarding unit 135 may comprise hardware circuits, microprocessors, and/or software configured to perform the method shown in FIG. 9. In some embodiments, the sending unit 125, receiving unit 130 and forwarding unit 135 are implemented by a single microprocessor. In other embodiments, the sending unit 125, receiving unit 130 and forwarding unit 135 may be implemented by two or more microprocessors.

Figure 11:
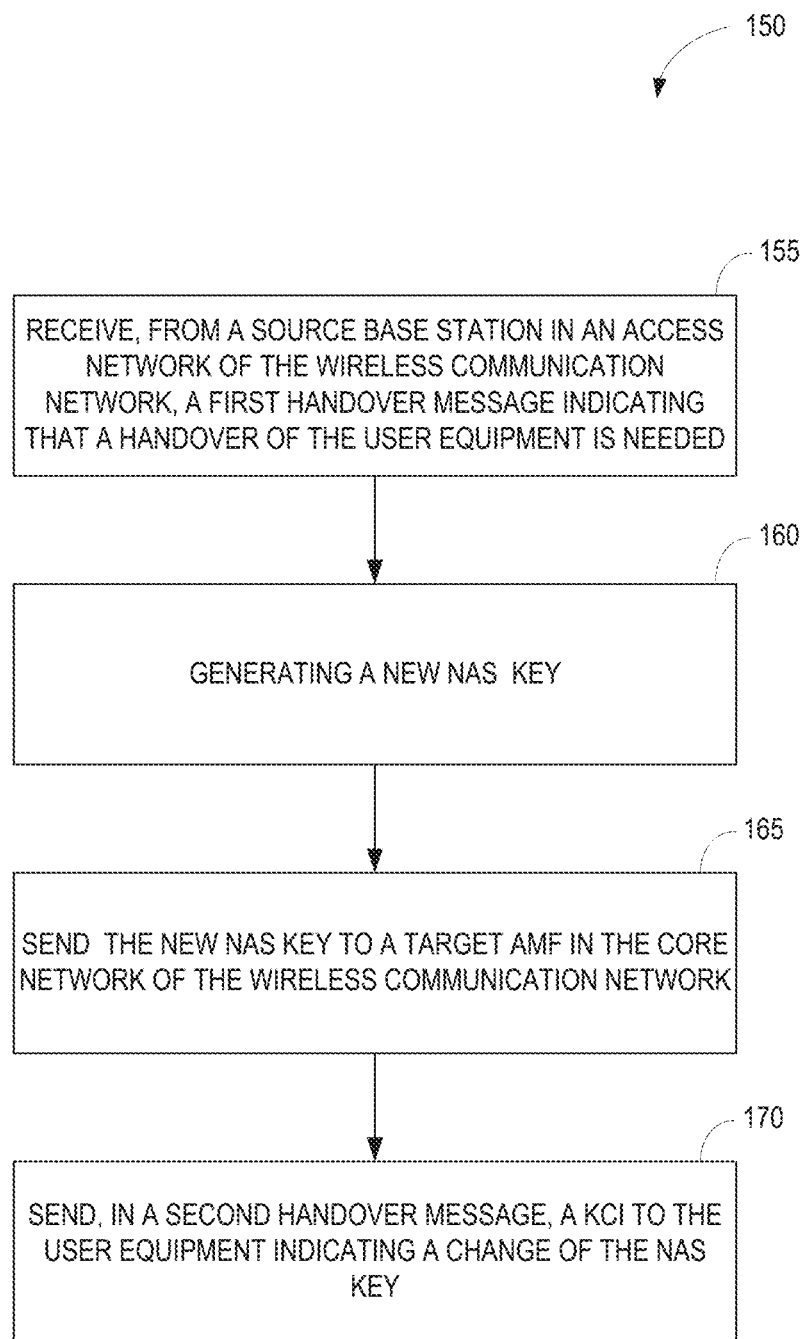
FIG. 11 illustrates a method implemented by a source AMF during a handover.

FIG. 11 illustrates an exemplary method 150 implemented during a handover by a source AMF 40 in a core network 30 of a wireless communication network 10. The source AMF 40 receives, from the source base station 25, a first handover message indicating that a handover of the UE 70 is needed (block 155). The source AMF generates a new non-access stratum key (e.g. KCN) (block 160), and sends the new non-access stratum key to a target AMF 40 in the core network 30 of the wireless communication network 10 (block 165). The source AMF 40 also sends a KCI to the UE 70 in a second handover message (block 170). The KCI indicates a change of the non-access stratum key.

In some embodiments of the method 150, generating the new non-access stratum key comprises generating the new non-access stratum key from a previous non-access stratum key. In other embodiments, generating the new non-access stratum key comprises generating the new non-access stratum key from a previous non-access stratum key and the KDP. In some embodiments, the source AMF sends the KDP to the UE 70 along with the KCI in the second handover message.

Some embodiments of the method 150 further comprise selecting the target AMF 40, and generating the new non-access stratum key depending on the selection of the target AMF 40.

Some embodiments of the method 150 further comprise generating two or more non-access stratum keys, each for different target AMFs 40. In one example, the two or more non-access stratum keys are generated using different KDPs.

Some embodiments of the method 150 further comprise sending one or more security parameters to the target AMF 40. In one example, the one or more security parameters are transmitted to the target AMF 40 in the second handover message. In one example, the one or more security parameters include UE capability information.

Some embodiments of the method 150 further comprise receiving, from the target AMF 40, a security algorithm parameter indicating at least one security algorithm, and forwarding the security algorithm parameter to the UE 70. In another example, the security algorithm parameter is received from the target AMF 40 in a forward relocation response message.

In one embodiment of the method 150, the first handover message comprises a handover required message indicating a need for a handover of the UE 70.

In one embodiment of the method 150, the second handover message comprises a handover command including the KCI.

In one embodiment of the method 150, the new non-access stratum key is sent to the target AMF (40) in a forward relocation request message.

In one embodiment of the method 150, the non-access stratum key comprises a core network key (Kcn).

Figure 12:
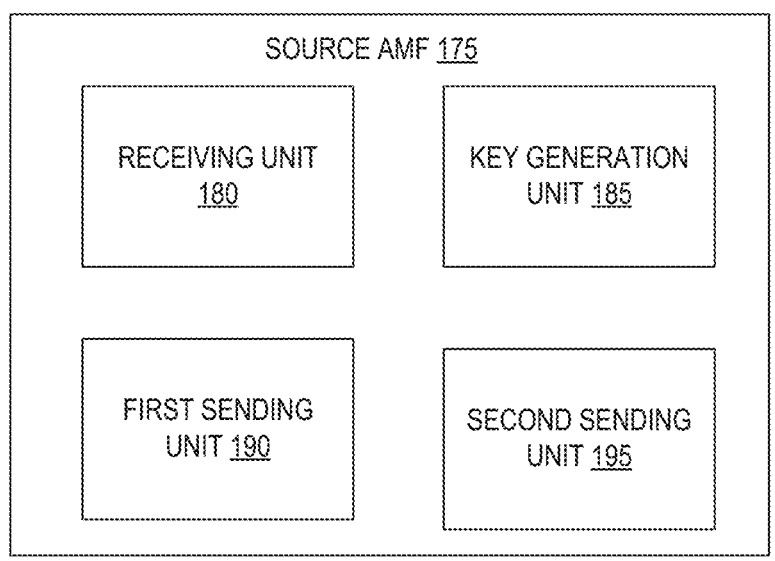
FIG. 12 illustrates an exemplary source AMF configured to perform the method of FIG. 9.

FIG. 12 is an exemplary source AMF 175 configured to perform the method 150 shown in FIG. 11. The source AMF 175 comprises a receiving unit 180, a key generating unit 185, a first sending unit 190 and second sending unit 195. The receiving unit 180 is configured to receive, from a source base station 25, a first handover message indicating that a handover of the UE 70 is needed. The key generating unit 185 is configured to generate a new non-access stratum key (e.g. KCN) as herein described. The first sending unit 190 is configured to send the new non-access stratum key to a target AMF 40 in the core network 30 of the wireless communication network 10. The second sending unit 195 is configured to send a KCI to the UE 70 in a second handover message. The KCI indicates a change of the non-access stratum key. The receiving unit 180, a key generating unit 185, first sending unit 190 and second sending unit 195 may comprise hardware circuits, microprocessors, and/or software configured to perform the method shown in FIG. 11. In some embodiments, the receiving unit 180, key generating unit 185, first sending unit 190 and second sending unit 195 are implemented by a single microprocessor. In other embodiments, the receiving unit 180, key generating unit 185, first sending unit 190 and second sending unit 195 may be implemented by two or more microprocessors.

Figure 13:
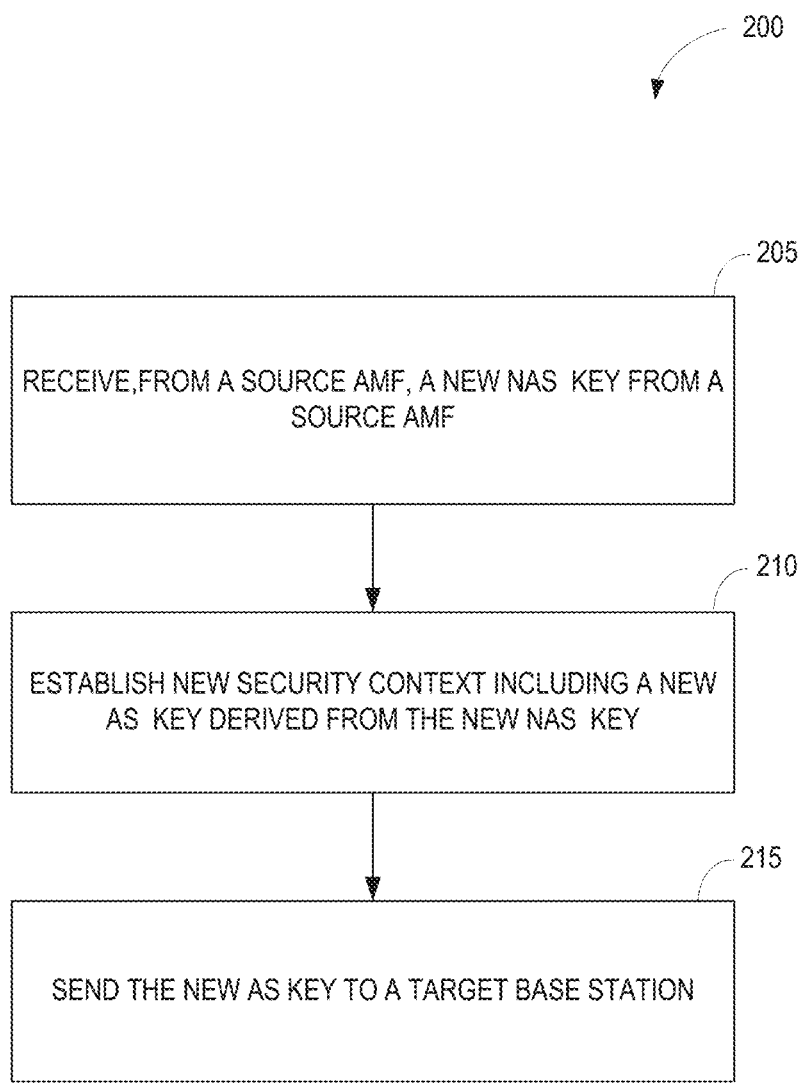
FIG. 13 illustrates a method implemented by a target AMF during a handover.

FIG. 13 illustrates an exemplary method 200 implemented during a handover by a target AMF 40 in a core network 30 of a wireless communication network 10. The target AMF 40 receives, from the source AMF 40, a new non-access stratum key (e.g. KCN) (block 205). The target AMF establishes a new security context including a new access stratum key derived from the new non-access stratum key (block 210), and sends the new access stratum key to a target base station 25 (block 215).

Some embodiments of method 200 further comprise receiving one or more security parameters from the source mobility management function. In one example, the one or more security parameters include UE capability information. In one embodiment, the security parameters are received with the new non-access stratum key.

In some embodiments of method 200, establishing the new security context comprises selecting one or more security algorithms. In one example, at least one of the security algorithms is selected based on the UE capability information.

Some embodiments of method 200 further comprise sending to the source mobility management function, a security algorithm parameter indicating at least one security algorithm for the new security context.

In some embodiments of method 200, the new non-access stratum key is received from the source mobility management function in a forward relocation request message.

In some embodiments of method 200, the new access stratum key is sent to the target base station in a handover request.

In some embodiments of method 200, the security algorithm parameter is sent to the source mobility management function in a forward relocation response message.

In some embodiments of method 200, the non-access strum key comprises a core network key (KCN).

Figure 14:
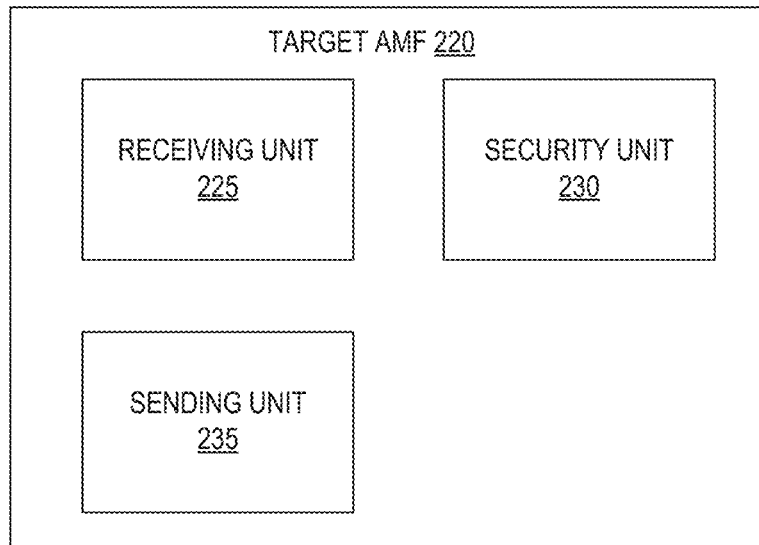
FIG. 14 illustrates an exemplary target AMF configured to perform the method of FIG. 13.

FIG. 14 is an exemplary target AMF 220 configured to perform the method 200 shown in FIG. 13. The target AMF 220 comprises a receiving unit 225, a security unit 230 and a sending unit 235. The receiving unit 225 is configured to receive, from a source AMF 40, a new non-access stratum key (e.g. KCN). The security unit 230 is configured to establish a new security context including a new access stratum key derived from the new non-access stratum key, The sending unit 235 is configured to send the new access stratum key to a target base station 25. The receiving unit 225, security unit 230 and sending unit 235 may comprise hardware circuits, microprocessors, and/or software configured to perform the method shown in FIG. 13. In some embodiments, the receiving unit 225, security unit 230 and sending unit 235 are implemented by a single microprocessor. In other embodiments, the receiving unit 225, security unit 230 and sending unit 235 may be implemented by two or more microprocessors.

Figure 15:
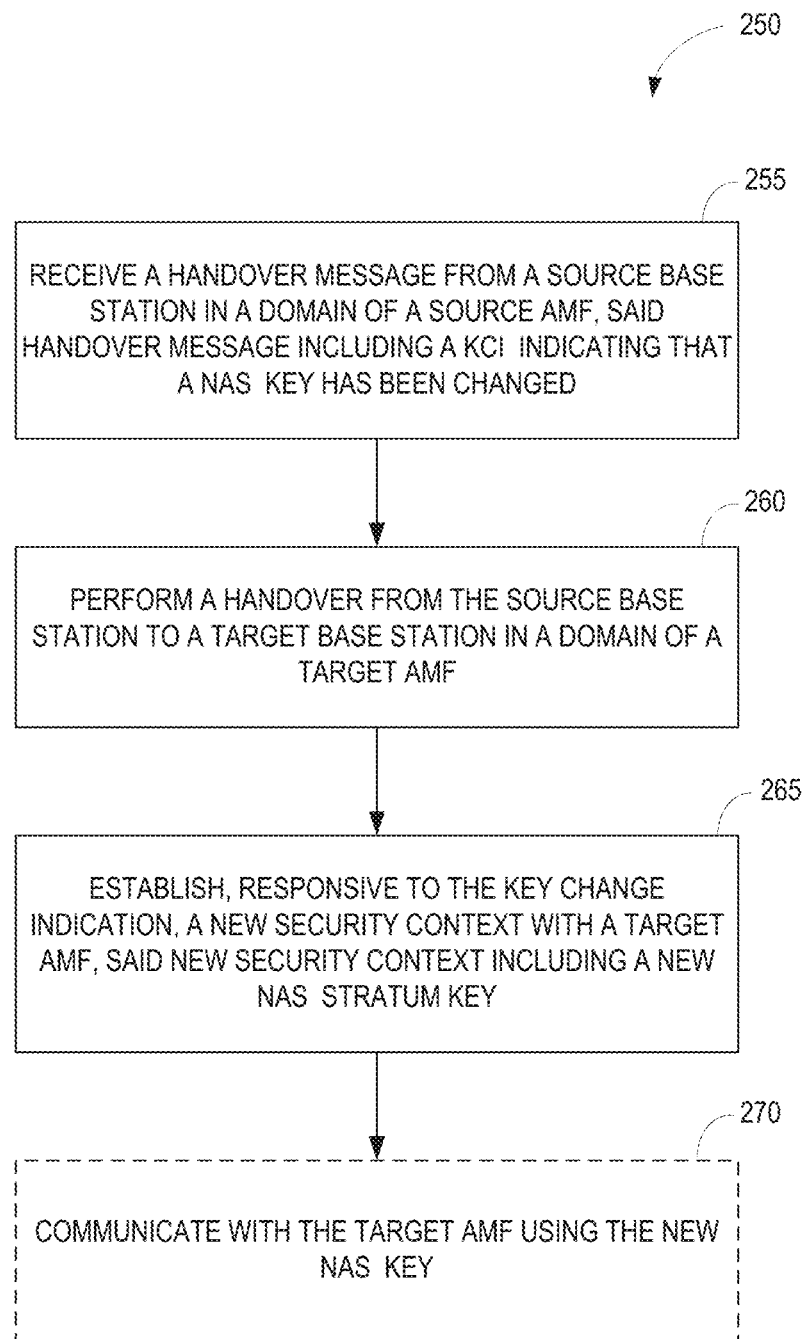
FIG. 15 illustrates a method implemented by a UE during a handover

FIG. 15 illustrates an exemplary method 250 implemented by a UE 70 in a wireless communication network 10 during a handover. The UE 70 receives a handover message including a KCI from a source base station 25 in the domain of a source AMF 40 of the wireless communication network 10 (block 255). The KCI indicates to the UE 70 that a non-access stratum key (e.g. KCN) has been changed. The UE 70 performs a handover from the source base station 25 to a target base station 25 in a domain of a target AMF 40 (block 260). The UE 70 establishes, responsive to the KCI, a new security context with the target AMF 40 (block 265). The new security context includes a new non-access stratum key. The UE 70 may optionally communicate with the target AMF 40 using the new non-access stratum key (block 270).

In some embodiments of the method 250, the KCI comprises a key change indicator flag set to a value indicating that the non-access stratum key has been changed. In other embodiments, the KCI comprises a security parameter implicitly indicating that the non-access stratum key has been changed. The security parameter comprises a KDP used to generate the new non-access stratum key.

Some embodiments of the method 250 further comprise generating the new non-access stratum key using the KDP. In one example, the KDP comprises one of a nonce, timestamp, freshness parameter, version number and static information known to the UE 70 and the source AMF. In some embodiments, the KDP is received with the KCI in the second handover message. In some embodiments, the KDP serves as an implicit KCI.

Some embodiments of the method 250 further comprise generating a new access stratum key from the new non-access stratum key, and communicating with a target base station 25 using the new access stratum key.

Some embodiments of the method 250 further comprise receiving a security algorithm parameter from the source base station 25 identifying one or more security algorithms used in the new security context. In one example, the security algorithm parameter is received in the handover message along with the KCI.

In some embodiments of the method 250, the handover message comprises a handover command.

In some embodiments of the method 250, the non-access stratum key comprises a core network key (Kcn).

Figure 16:
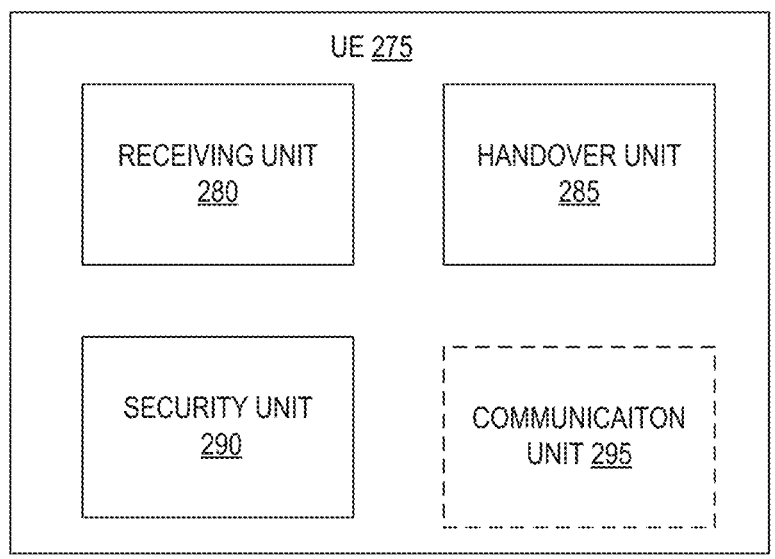
FIG. 16 illustrates an exemplary UE configured to perform the method of FIG. 15.

FIG. 16 is an exemplary UE 275 configured to perform the method 250 shown in FIG. 15. The UE 275 comprises a receiving unit 280, a handover unit 285 and a security unit 290. The receiving unit 280 is configured to receive a handover message including a KCI from a source base station 25 in the domain of a source AMF 40 of the wireless communication network 10. The KCI indicates to the UE 70 that a non-access stratum key (e.g. KCN) has been changed. The handover unit 285 is configured to perform a handover from the source base station 25 to a target base station 25 in a domain of a target AMF 40. The security unit 290 is configured to establish, responsive to the KCI, a new security context with the target AMF 40. The UE 275 may also optionally include and a communication unit 295 configured to communicate with the target AMF 40 using the new non-access stratum key. The receiving unit 280, handover unit 285, security unit 290 and communication unit 290 may comprise hardware circuits, microprocessors, and/or software configured to perform the method shown in FIG. 15. In some embodiments, the receiving unit 280, handover unit 285, security unit 290 and communication unit 290 are implemented by a single microprocessor. In other embodiments, the receiving unit 280, handover unit 285, security unit 290 and communication unit 290 may be implemented by two or more microprocessors.

Figure 17:
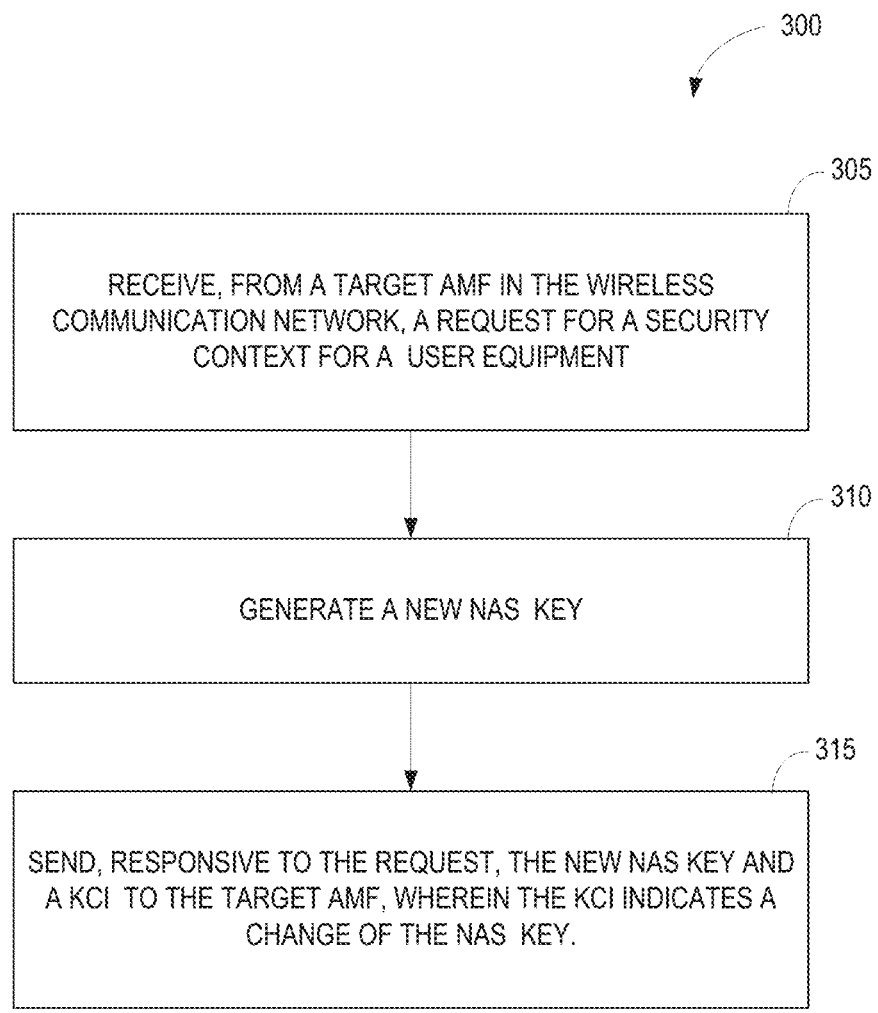
FIG. 17 illustrates a method implemented by a source AMF when a UE changes AMFs in idle mode.

FIG. 17 illustrates an exemplary method 300 implemented by a source AMF 40 in a core network 30 of the communication network 10 when a UE 70 in idle mode changes AMFs 40. The source AMF 40 receives a request for a security context for the UE 70 from a target AMF 40 (block 305). The source AMF 40 generates a new non-access stratum key (e.g. KCN) (block 310), and sends, responsive to the request, the new non-access stratum key and a KCI to the target AMF 40 (block 315). The KCI indicates a change of the non-access stratum key.

In some embodiments of the method 300, generating a new non-access stratum key comprises generating the new non-access stratum key from the old non-access stratum key. In other embodiments, generating a KDP, and generating the new non-access stratum key from an old non-access stratum key and the KDP.

In some embodiments of the method 300, the key change indication comprises a key change indicator flag set to a value indicating that the non-access stratum key has been changed. In other embodiments, the KCI comprises a security parameter implicitly indicating that the non-access stratum key has been changed. The security parameter may comprise, for example, a KDP used to generate the new non-access stratum key.

Some embodiments of the method 300 further comprise sending, responsive to the request, a KDP used to generate the new non-access stratum key. The KDP comprises one of a nonce, timestamp, freshness parameter and version number.

Some embodiments of the method 300 further comprise selecting the target AMF 40, and generating a new non-access stratum key depending on the selection of the target AMF 40.

In some embodiments of the method 300, generating a new non-access stratum key comprises generating two or more non-access stratum keys, each for a different target AMF 40. In one example, the two or more non-access stratum keys are generated using different KDPs.

Some embodiments of the method 300 further comprise sending one or more security parameters with the new non-access stratum key to the target AMF 40. In one example, the one or more security parameters include UE capability information.

In some embodiments of the method 300, the request for a security context is received from the target AMF 40 in a context request message.

In some embodiments of the method 300, the new non-access stratum key is sent to the target AMF 40 in a context request response message.

In some embodiments of the method 300, the non-access stratum key comprises a core network key (KCN).

Figure 18:
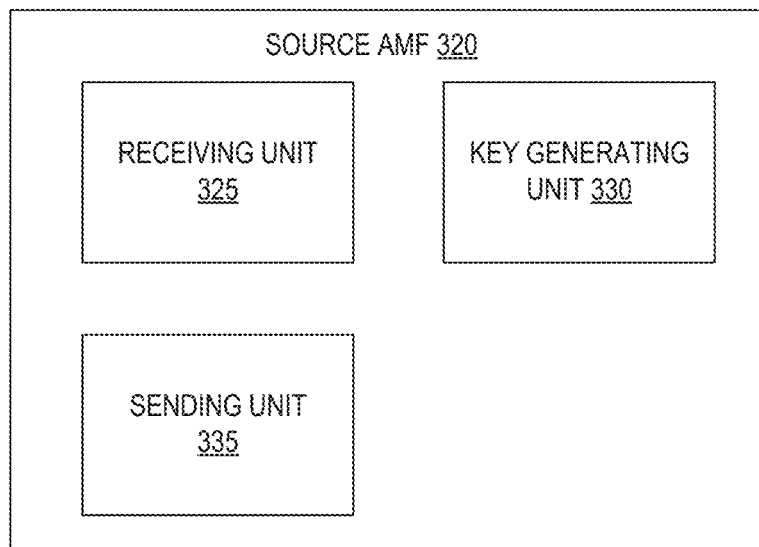
FIG. 18 illustrates an exemplary source AMF configured to perform the method of FIG. 9.

FIG. 18 is an exemplary source AMF 320 configured to perform the method 300 shown in FIG. 17. The source AMF 320 comprises a receiving unit 325, a key generating unit 330 and a sending unit 335. The receiving unit 325 is configured receive a request for a security context for the UE 70 from a target AMF 40. The key generating unit 330 is configured to generate a new non-access stratum key (e.g. KCN). The sending unit 235 is configured to send, responsive to the request, the new non-access stratum key and a KCI to the target AMF 40. The receiving unit 325, a key generating unit 330 and a sending unit 335 may comprise hardware circuits, microprocessors, and/or software configured to perform the method shown in FIG. 17. In some embodiments, the receiving unit 325, key generating unit 330 and sending unit 335 are implemented by a single microprocessor. In other embodiments, the receiving unit 325, key generating unit 330 and sending unit 335 may be implemented by two or more microprocessors.

Figure 19:
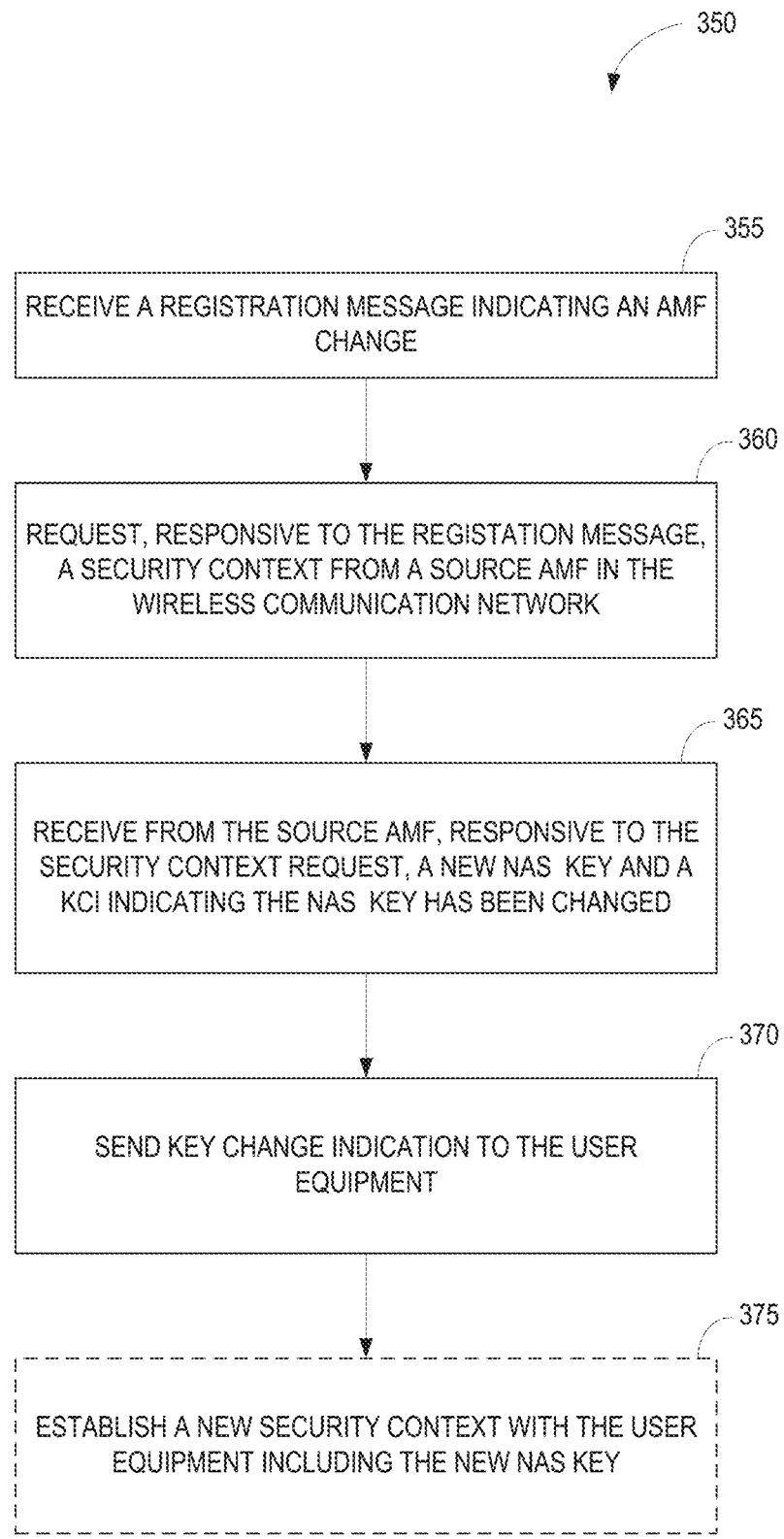
FIG. 19 illustrates a method implemented by a target AMF when a UE changes AMFs in idle mode.

FIG. 19 illustrates an exemplary method 350 implemented by a target AMF 40 in a core network 30 of a wireless communication network 10 when a UE 70 in idle mode changes AMFs 40. The target AMF 40 receives, from the UE 70, a registration message or other control message indicating an AMF change (block 355). The target AMF 40 requests a security context from a source AMF 40 in the wireless communication network (block 360). Responsive to the request, the target AMF 40 receives a new non-access stratum key (e.g. KCN) and a KCI indicating the non-access stratum key has been changed (block 365). The target AMF 40 sends the KCI to the UE 70 (block 370) and optionally establishes a new security context for the UE 70 including the new non-access stratum key (block 375).

Some embodiments of the method 350 further comprise establishing a new security context including the new non-access stratum key.

Some embodiments of the method 350 further comprise receiving one or more security parameters from the source AMF 40. In example, the one or more security parameters include UE capability information. In another example, the security parameters are received along with the KCI.

In some embodiments of the method 350, the key change indication comprises a key change indicator flag set to a value indicating that the non-access stratum key has been changed. In other embodiments, the key change indication comprises a security parameter implicitly indicating that the non-access stratum key has been changed. The security parameter may comprise, for example, a KDP used to generate the new non-access stratum key.

Some embodiments of the method 350 further comprise receiving, responsive to the request, a KDP used to generate the new non-access stratum key. In one example KDP comprises one of a nonce, timestamp, freshness parameter and version number. In some embodiments, the target AMF 40 sends the KDP to the UE 70 along with the KCI in a NAS SMC message.

In some embodiments of the method 350, establishing a new security context comprises, in part, selecting one or more security algorithms. In one example, at least one of the security algorithms is selected based on UE capability information.

Some embodiments of the method 350 further comprise sending the UE 70 a security algorithm parameter indicating at least one security algorithm for the new security context.

In some embodiments of the method 350, the KCI is received from a source AMF 70 in a context request response message.

In some embodiments of the method 350, the KCI is sent to the uE 70 in a security establishment message.

In some embodiments of the method 350, the non-access stratum key comprises a core network key (KCN).

Figure 20:
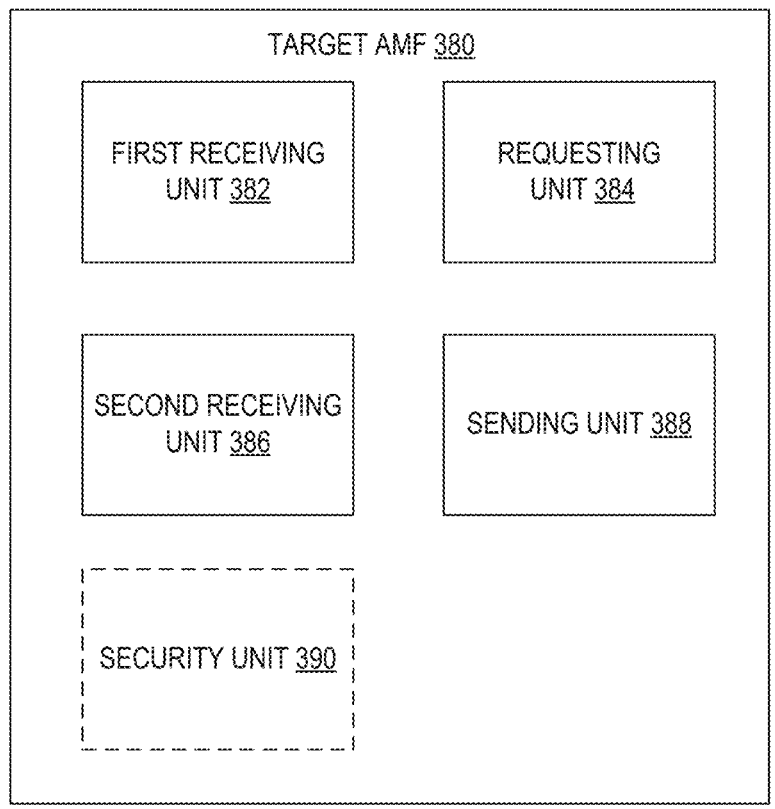
FIG. 20 illustrates an exemplary target AMF configured to perform the method of FIG. 19.

FIG. 20 is an exemplary target AMF 380 configured to perform the method 350 shown in FIG. 19. The base station 380 comprises a first receiving unit 382, a requesting unit 384, a second receiving unit 386, and a sending unit 388. The first receiving unit 382 is configured to receive, from the UE 70, a registration message or other control message indicating an AMF change. The requesting unit 384 is configured to request, responsive to the registration message, a security context from a source AMF 40 in the wireless communication network. The second receiving unit 386 is configured to receive, from the source AMF 40 responsive to the security context request, a new non-access stratum key and a KCI indicating that the non-access stratum key (e.g. KCN) has been changed. The sending unit 388 is configured to send the KCI to the UE 70. The base station 380 may also optionally include a security unit 390 configured to establish a new security context for the UE 70 including the new non-access stratum key. The first receiving unit 382, requesting unit 384, second receiving unit 386, sending unit 388 and security unit 390 may comprise hardware circuits, microprocessors, and/or software configured to perform the method shown in FIG. 19. In some embodiments, the first receiving unit 382, requesting unit 384, second receiving unit 386, sending unit 388 and security unit 390 are implemented by a single microprocessor. In other embodiments, the first receiving unit 382, requesting unit 384, second receiving unit 386, sending unit 388 and security unit 390 may be implemented by two or more microprocessors.

Figure 21:
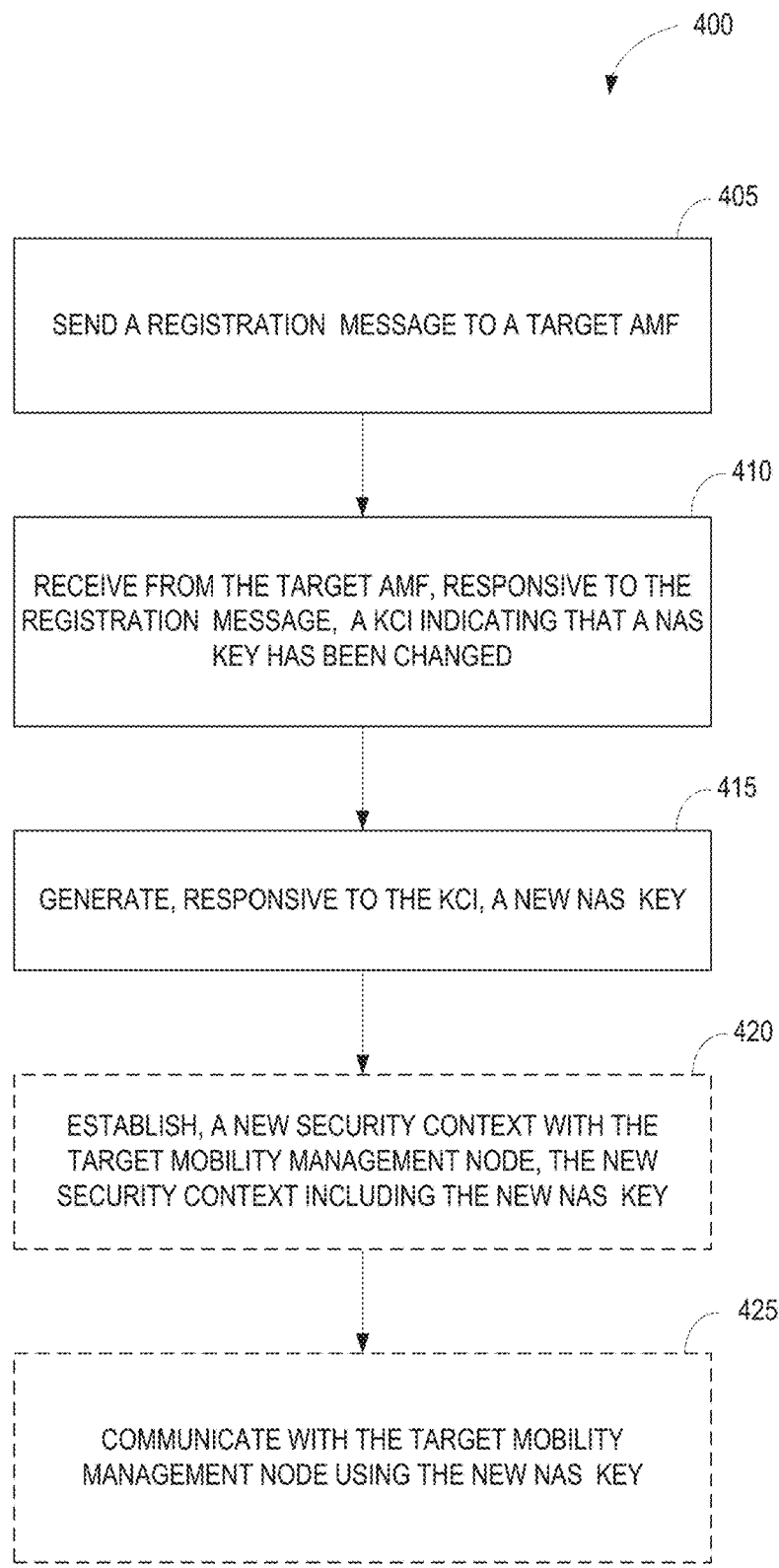
FIG. 21 illustrates a location update method implemented by a UE when a UE moves between AMFs in idle mode.

FIG. 21 illustrates an exemplary method 400 implemented by an idle mode UE 70 in a wireless communication network 10 when the UE 70 changes AMFs 40. The UE 70 sends a registration message or other control message to a target AMF 40 in the wireless communication network (block 405). The UE 70 receives, responsive to the registration message or other control message, a KCI indicating that a non-access stratum key (e.g. KCN) has been changed (block 410). Responsive to the KCI, the UE 70 generates a new non-access stratum key (block 415). After generating the new non-access stratum key, the UE 70 may optionally establish a new security context with the target AMF 40 (block 420), where the new security context includes the new non-access stratum key and thereafter communicate with the target AMF 40 using the new non-access stratum key (block 425).

Some embodiments of the method 350 further comprise establishing, a new security context with the target AMF 40, the new security context including the new non-access stratum key, and communicating with the target AMF 40 using the new non-access stratum key.

In some embodiments of the method 400, the KCI comprises a key change indicator flag set to a value indicating that the non-access stratum key has been changed. In other embodiments, the KCI comprises a security parameter implicitly indicating that the non-access stratum key has been changed. In one example, the security parameter comprises one of a nonce, timestamp, freshness parameter and version number.

Some embodiments of the method 400 further comprise receiving a KDP from the target AMF 40, and generating the new non-access stratum key using the KDP. In on example, the KDP comprises one of a nonce, timestamp, freshness parameter and version number. In another example, the KDP is received with the KCI. In some embodiments, the KDP serves as an implicit KCI.

In some embodiments of the method 400, generating the new non-access stratum key comprises generating the new non-access stratum key from the previous non-access stratum key. In other embodiments of the method 400, generating the new non-access stratum key comprises generating the new non-access stratum key from the previous non-access stratum key and a KDP. The various embodiments, the KDP comprises at least one of a nonce, timestamp, freshness parameter and version number. In other embodiments, the KDP comprises static information that is known to the UE 70 and the source AMF 40

Some embodiments of the method 400 further comprise receiving a security algorithm parameter from the target AMF 40 identifying one or more security algorithms used in the new security context. In one example, the security algorithm parameter is received with the KCI.

In some embodiments of the method 400, the new non-access stratum key is received in a security establishment message.

In some embodiments of the method 400, the non-access stratum key comprises a core network key (KCN).

Figure 22:
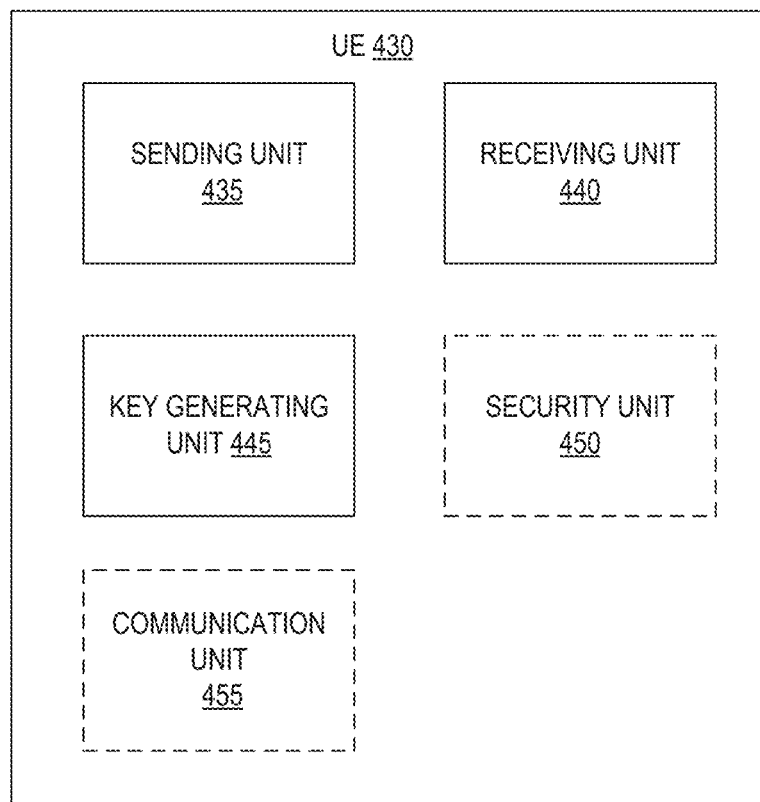
FIG. 22 illustrates an exemplary UE configured to perform the method of FIG. 21.

FIG. 22 is an exemplary UE 430 configured to perform the method 400 shown in FIG. 21. The UE 430 comprises a sending unit 435, a receiving unit 440 and a key generating unit 445. The sending unit 435 is configured to send a registration message or other control message to a target AMF 40 in the wireless communication network. The receiving unit 440 is configured to receive, responsive to the registration message or other control message, a KCI indicating that a non-access stratum key has been changed. The key generating unit 445 is configured to generate, responsive to the KCI, a new non-access stratum key. The UE 430 may also optionally include security unit 450 configured to establish a new security context with the target AMF 40, and a communication unit 350 configured to communicate with the target AMF 40 using the new non-access stratum key. The sending unit 435, receiving unit 440, key generating unit 445, security unit 450 and communication unit 455 may comprise hardware circuits, microprocessors, and/or software configured to perform the method shown in FIG. 9. In some embodiments, the sending unit 435, receiving unit 440, key generating unit 445, security unit 450 and communication unit 455 are implemented by a single microprocessor. In other embodiments, the sending unit 435, receiving unit 440, key generating unit 445, security unit 450 and communication unit 455 may be implemented by two or more microprocessors.

Figure 23:
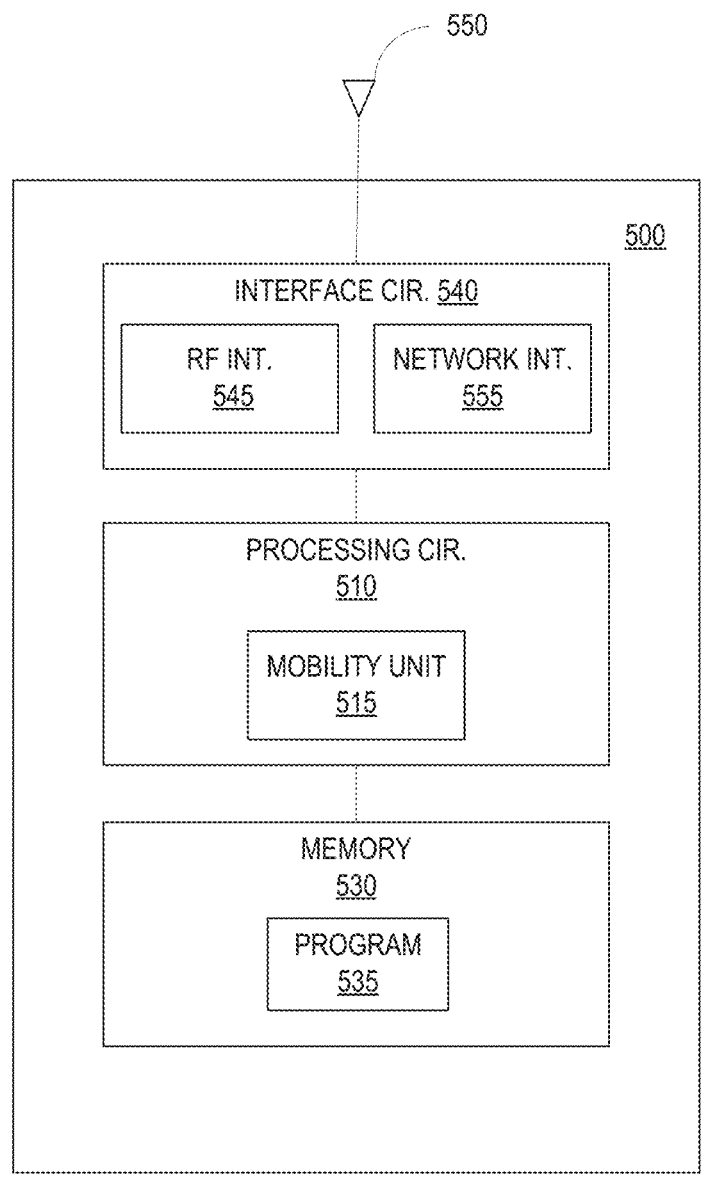
FIG. 23 illustrates an exemplary base station configured to implement the security context handling procedures as herein described.

FIG. 23 illustrates the main functional components of base station 500 configured to implement the security context handling methods as herein described. The base station 500 comprises a processing circuit 510, a memory 530, and an interface circuit 540.

The interface circuit 540 includes a radio frequency (RF) interface circuit 545 coupled to one or more antennas 550. The RF interface circuit 550 comprises the radio frequency (RF) components needed for communicating with the UEs 70 over a wireless communication channel. Typically, the RF components include a transmitter and receiver adapted for communications according to the 5G standards or other Radio Access Technology (RAT). The interface circuit 540 further includes a network interface circuit 555 for communicating with core network nodes in the wireless communication network 10.

The processing circuit 510 processes the signals transmitted to or received by the base station 500. Such processing includes coding and modulation of transmitted signals, and the demodulation and decoding of received signals. The processing circuit 510 may comprise one or more microprocessors, hardware, firmware, or a combination thereof. The processing circuit 510 includes a mobility unit 515 for performing handover-related functions. The mobility unit 515 comprises the processing circuitry dedicated to mobility-related functions. The mobility unit 515 is configured to perform the methods and procedures as herein described, including the methods shown in FIGS. 2, 6, 7, and 9.

Memory 530 comprises both volatile and non-volatile memory for storing computer program code and data needed by the processing circuit 510 for operation. Memory 530 may comprise any tangible, non-transitory computer-readable storage medium for storing data including electronic, magnetic, optical, electromagnetic, or semiconductor data storage. Memory 530 stores a computer program 535 comprising executable instructions that configure the processing circuit 510 to implement the methods and procedures described herein including method 100 according to FIGS. 2, 6, 7, and 9. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, computer program 535 for configuring the processing circuit 510 as herein described may be stored in a removable memory, such as a portable compact disc, portable digital video disc, or other removable media. The computer program 535 may also be embodied in a carrier such as an electronic signal, optical signal, radio signal, or computer readable storage medium.

Figure 24:
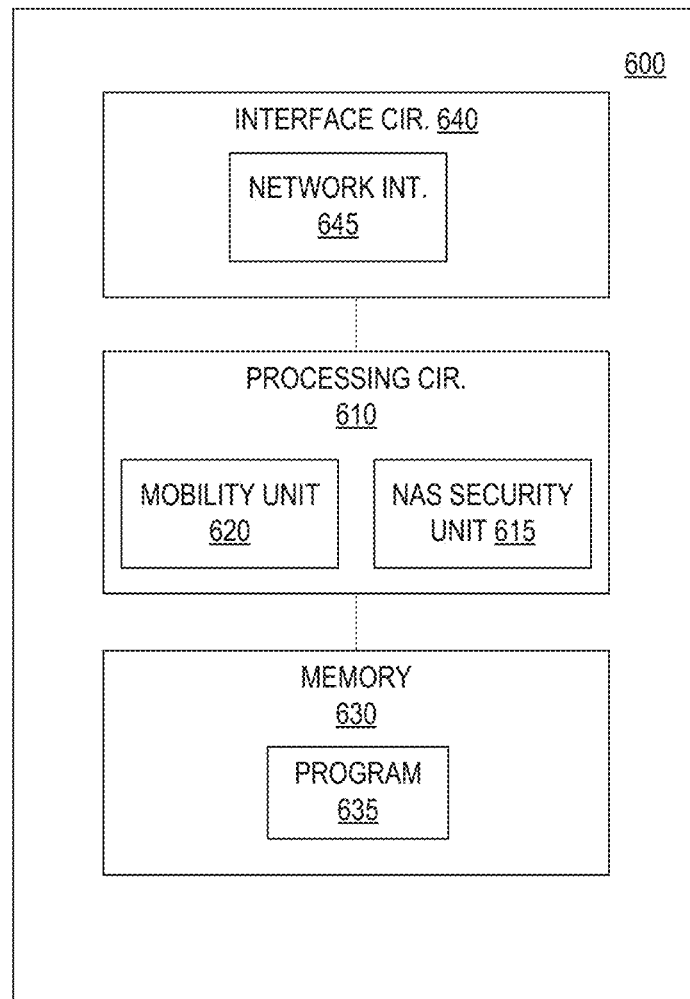
FIG. 24 illustrates an exemplary core network node configured to implement the security context handling procedures as herein described.

FIG. 24 illustrates the main functional components of a core network node 600 in the wireless communication network 10 configured to implement the security context handling procedure as herein described. The core network node 600 may be used to implement core network functions, such as the source AMF 40 and target AMF 40 as herein described. Those skilled in the art will appreciate that a core network function, such as the AMF 40, may be implemented by a single core network node, or may be distributed among two or more core network nodes.

The core network node 600 comprises a processing circuit 610, a memory 630, and an interface circuit 640. The interface circuit 640 includes a network interface circuit 645 to enable communication with other core network nodes and with base stations 25 in the RAN.

The processing circuit 610 controls the operation of the core network node 600. The processing circuit 610 may comprise one or more microprocessors, hardware, firmware, or a combination thereof. The processing circuit 610 may include a NAS security unit 615 to handle NAS-related security functions and a mobility management unit 620 to handle mobility management functions. Generally, the NAS security unit 615 is responsible for deriving security keys, establishing a security context, and other related security functions. The mobility management unit 620 is responsible for handling mobility management functions and related signaling. As described previously, the NAS security unit 615 may provide the mobility management unit 620 with information, such as NAS keys, KDPs, and other security parameters to be sent to the UE 70. In some embodiments, the NAS security unit 615 and the mobility management unit 620 may reside in the same core network node. In other embodiments, they may reside in different core network nodes. In one exemplary embodiment, the NAS security unit 615 and the mobility management unit 620 are configured to perform the methods and procedures as herein described, including the methods shown in FIGS. 2, 3, 6-8, 11, 13, 17, and 19.

Memory 630 comprises both volatile and non-volatile memory for storing computer program code and data needed by the processing circuit 610 for operation. Memory 630 may comprise any tangible, non-transitory computer-readable storage medium for storing data including electronic, magnetic, optical, electromagnetic, or semiconductor data storage. Memory 630 stores a computer program 635 comprising executable instructions that configure the processing circuit 610 to implement the methods and procedures described herein including methods according to FIGS. 2, 3, 6-8, 11, 13, 17, and 19. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, a computer program 635 for configuring the processing circuit 610 as herein described may be stored in a removable memory, such as a portable compact disc, portable digital video disc, or other removable media. The computer program 635 may also be embodied in a carrier such as an electronic signal, optical signal, radio signal, or computer readable storage medium.

Figure 25:
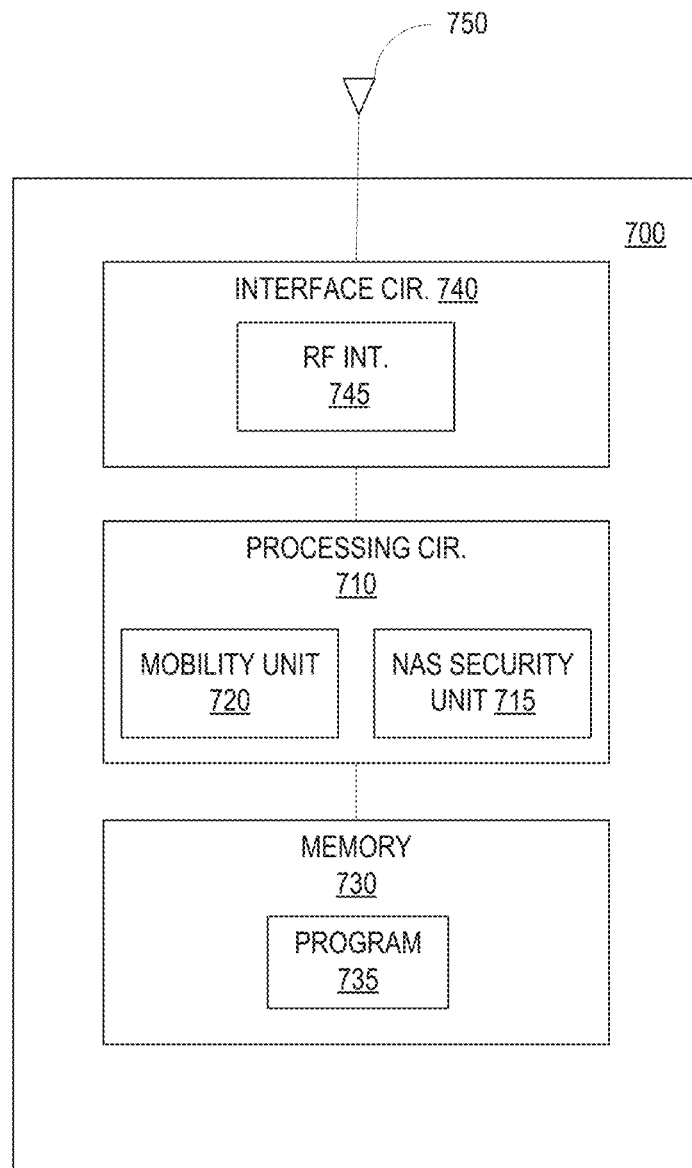
FIG. 25 illustrates an exemplary UE configured to implement the security context handling procedures as herein described.

FIG. 25 illustrates the main functional components of UE 700 configured to implement the security context handling methods as herein described. The UE 700 comprises a processing circuit 710, a memory 730, and an interface circuit 740.

The interface circuit 740 includes a radio frequency (RF) interface circuit 745 coupled to one or more antennas 750. The RF interface circuit 745 comprises the radio frequency (RF) components needed for communicating with the UEs 70 over a wireless communication channel. Typically, the RF components include a transmitter and receiver adapted for communications according to the 5G standards or other Radio Access Technology (RAT).

The processing circuit 710 processes the signals transmitted to or received by the UE 700. Such processing includes coding and modulation of transmitted signals, and the demodulation and decoding of received signals. The processing circuit 710 may comprise one or more microprocessors, hardware, firmware, or a combination thereof. The processing circuit 710 may include a NAS security unit 715 to handle NAS-related security functions and a mobility management unit 720 to handle mobility management functions. Generally, the NAS security unit 715 is responsible for deriving security keys, establishing a security context, and other security functions as herein described. The mobility management unit 720 is responsible for handling mobility management functions and related signaling. In one exemplary embodiment, the NAS security unit 715 and the mobility management unit 720 are configured to perform the methods and procedures as herein described, including the methods shown in FIGS. 2, 3, 6-8, 15 and 21.

Memory 730 comprises both volatile and non-volatile memory for storing computer program code and data needed by the processing circuit 710 for operation. Memory 730 may comprise any tangible, non-transitory computer-readable storage medium for storing data including electronic, magnetic, optical, electromagnetic, or semiconductor data storage. Memory 730 stores a computer program 735 comprising executable instructions that configure the processing circuit 710 to implement the methods and procedures described herein including method 100 according to FIGS. 2, 3, 6-8, 15 and 21. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, computer program 735 for configuring the processing circuit 710 as herein described may be stored in a removable memory, such as a portable compact disc, portable digital video disc, or other removable media. The computer program 735 may also be embodied in a carrier such as an electronic signal, optical signal, radio signal, or computer readable storage medium.

What is claimed is:

1. A method for transferring a security context during a handover of a user equipment, the method implemented by one or more core network nodes in a core network of the wireless communication network, wherein the one or more core network nodes provide a source Third Generation Partnership Project Fifth Generation systems (3GPP-5G) Access and Mobility Management Function, the method comprising:
   receiving, from a source base station, a first handover message indicating that a handover of the user equipment is needed;
   generating a new non-access stratum key responsive to determining that an operator specific policy is met;
   sending, responsive to the first handover message, the new non-access stratum key to a target 3GPP-5G Access and Mobility Management Function; and
   sending, to the user equipment, a second handover message including:
      a key change indicator flag set to a value indicating a change of the non-access stratum key; and
      an indication of at least one non-access stratum security algorithm selected by the target 3GPP-5G Access and Mobility Management Function and indicating a non-access stratum security algorithm to be used by the user equipment.

2. The method of claim 1 wherein generating the new non-access stratum key comprises:
   generating the new non-access stratum key from a previous non-access stratum key and a key derivation parameter.

3. The method of claim 2 further comprising sending the key derivation parameter to the user equipment.

4. The method of claim 1 wherein the first handover message is a handover required message indicating a need for a handover of the user equipment.

5. The method of claim 1 wherein the second handover message is a handover command.

6. The method of claim 1 wherein the new non-access stratum key is sent to the target 3GPP-5G Access and Mobility Management Function in a forward relocation request message.

7. The method of claim 1 wherein the non-access stratum key is a core network key.

8. A core network node in a core network of a wireless communication network, said core network node providing a source Third Generation Partnership Project Fifth Generation systems (3GPP-5G) Access and Mobility Management Function, said core network nodes comprising:
   an interface circuit for communicating with a source base station and a target 5G Access and Mobility Management Function; and
   a processing circuit configured to:
      receive, from a source base station, a first handover message indicating that a handover of the user equipment is needed;
      generate a new non-access stratum key responsive to determining that an operator specific policy is met;
      send, responsive to the first handover message, the new non-access stratum key to a target 3GPP-5G Access and Mobility Management Function; and
      send, to the user equipment, a second handover message including:
         a key change indicator flag set to a value indicating a change of the non-access stratum key; and
         an indication of at least one non-access stratum security algorithm selected by the target 3GPP-5G Access and Mobility Management Function and indicating a non-access stratum security algorithm to be used by the user equipment.

9. The core network node of claim 8 wherein the processing circuit is further configured to generate the new non-access stratum key by generating the new non-access stratum key from a previous non-access stratum key and a key derivation parameter.

10. The core network node of claim 9 wherein the processing circuit is further configured to send the key derivation parameter to the user equipment.

11. The core network node of claim 8 wherein the first handover message is a handover required message indicating a need for a handover of the user equipment.

12. The core network node of claim 8 wherein the second handover message is a handover command.

13. The core network node of claim 8 wherein the processing circuit is configured to send the new non-access stratum key to the target 3GPP-5G Access and Mobility Management Function in a forward relocation request message.

14. The core network node of claim 8 wherein the non-access stratum key is a core network key.

15. A method for establishing a new security context during a handover implemented by a user equipment in a wireless communication network, the method comprising:
receiving a handover message from a source base station, said handover message including:
a key change indicator flag set to a value indicating that a non-access stratum key has been changed based on an operator specific policy; and
an indication of at least one non-access stratum security algorithm selected by a target Third Generation Partnership Project Fifth Generation systems (3GPP-5G) Access and Mobility Management Function and indicating a non-access stratum security algorithm to be used by the user equipment;
performing a handover from the source base station to a target base station; and
establishing, responsive to the key change indicator flag, the new security context with the target 3GPP-5G Access and Mobility Management Function, said new security context including a new non-access stratum key.

16. The method of claim 15 further comprising generating the new non-access stratum key using a previous non-access stratum key and a key derivation parameter.

17. The method of claim 16 wherein the key derivation parameter comprises one of a nonce, timestamp, freshness parameter, version number, and static information.

18. The method of claim 16 wherein the key derivation parameter is received with the key change indicator flag in the handover message.

19. The method of claim 15 wherein the handover message is a handover command.

20. The method of claim 15 wherein the non-access stratum key is a core network key.

21. A user equipment for handover implemented by a user equipment in a wireless communication network, the user equipment comprising:
an interface circuit for communicating with one or more base stations in the wireless communication network; and
a processing circuit configured to:
receive a handover message from a source base station in the wireless communication network, said handover message including:
a key change indicator flag set to a value indicating that a non-access stratum key has been changed based on an operator specific policy;
an indication of at least one non-access stratum security algorithm selected by a target Third Generation Partnership Project Fifth Generation systems (3GPP-5G) Access and Mobility Management Function and indicating a non-access stratum security algorithm to be used by the user equipment;
perform a handover from the source base station to a target base station in the wireless communication network; and
establish, responsive to the key change indicator flag, a new security context with the target 3G PP-5G Access and Mobility Management Function, said new security context including a new non-access stratum key.

22. The user equipment of claim 21 wherein the processing circuit is further configured to generate the new non-access stratum key using a previous non-access stratum key and a key derivation parameter.

23. The user equipment of claim 22 wherein the key derivation parameter comprises one of a nonce, timestamp, freshness parameter, version number, and static information.

24. The user equipment of claim 22 wherein the processing circuit is further configured to receive the key derivation parameter with the key change indicator flag in the handover message.

25. The user equipment of claim 21 wherein the handover message is a handover command.

26. The user equipment of claim 21 wherein the non-access stratum key is a core network key.

* * * * *

UNITED STATES PATENT AND TRADEMARK OFFICE
CERTIFICATE OF CORRECTION

PATENT NO. : 10,536,849 B2
APPLICATION NO. : 16/235438
DATED : January 14, 2020
INVENTOR(S) : Ben Henda et al.

Page 1 of 1

It is certified that error appears in the above-identified patent and that said Letters Patent is hereby corrected as shown below:

In the Specification

In Column 3, Line 51, delete "key" and insert -- key. --, therefor.

In Column 5, Line 27, delete "key" and insert -- key. --, therefor.

In Column 6, Line 8, delete "procedure" and insert -- procedure. --, therefor.

In Column 6, Line 28, delete "handover" and insert -- handover. --, therefor.

In Column 14, Line 53, delete "key," and insert -- key. --, therefor.

In Column 17, Line 50, delete "uE" and insert -- UE --, therefor.

In Column 18, Line 62, delete "AMF 40" and insert -- AMF 40. --, therefor.

In the Claims

In Column 24, Line 30, in Claim 21, delete "3G PP-5G" and insert -- 3GPP-5G --, therefor.

Signed and Sealed this
Second Day of June, 2020

Andrei Iancu
*Director of the United States Patent and Trademark Office*